(12) United States Patent  
Katsuta et al.

(10) Patent No.: US 8,867,203 B2  
(45) Date of Patent: Oct. 21, 2014

(54) LOCKING DEVICE, ELECTRONIC DEVICE, AND LOCKING METHOD

(75) Inventors: Masao Katsuta, Fuchu (JP); Shigeki Tanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 263 days.

(21) Appl. No.: 13/459,758

(22) Filed: Apr. 30, 2012

(65) Prior Publication Data

US 2012/0212910 A1    Aug. 23, 2012

Related U.S. Application Data

(63) Continuation of application No. PCT/JP2009/070785, filed on Dec. 11, 2009.

(51) Int. Cl.
| | | |
|---|---|---|
| *G06F 1/16* | (2006.01) | |
| *E05B 73/00* | (2006.01) | |
| *H05K 5/00* | (2006.01) | |
| *H05K 7/00* | (2006.01) | |

(52) U.S. Cl.
CPC ............ *G06F 1/1632* (2013.01); *G06F 1/1656* (2013.01); *G06F 1/1616* (2013.01); *E05B 73/0082* (2013.01)
USPC ............ 361/679.43; 361/679.01; 361/679.02; 361/679.4; 361/679.41; 361/679.44

(58) Field of Classification Search
USPC ............... 361/679.01, 679.02, 679.4, 679.41, 361/679.42, 679.43, 679.44, 679.45
See application file for complete search history.

(56) References Cited

U.S. PATENT DOCUMENTS

| | | | |
|---|---|---|---|
| 5,829,997 A * | 11/1998 | Okano et al. .................. | 439/310 |
| 5,988,778 A | 11/1999 | Lammens | |
| 6,560,103 B1 | 5/2003 | Dohi et al. | |
| 2005/0109072 A1 | 5/2005 | Ling et al. | |
| 2006/0092605 A1 | 5/2006 | DeLuga et al. | |
| 2009/0027849 A1 | 1/2009 | Tanaka | |

FOREIGN PATENT DOCUMENTS

| | | |
|---|---|---|
| JP | 10-57168 | 3/1998 |
| JP | 2000-112566 | 4/2000 |
| JP | 2006-127522 | 5/2006 |
| JP | 2009-26234 | 2/2009 |
| WO | 00/49250 | 8/2000 |
| WO | WO 2006/117858 A1 | 11/2006 |
| WO | 2008/137196 | 11/2008 |

OTHER PUBLICATIONS

International Search Report for PCT/JP2009/070785 mailed Mar. 30, 2010.
Extended European Search Report dated May 28, 2014 in Appln. No. 09852080.2.

* cited by examiner

*Primary Examiner* — Hoa C Nguyen  
*Assistant Examiner* — Binh Tran  
(74) *Attorney, Agent, or Firm* — Staas & Halsey LLP

(57) ABSTRACT

A locking device includes a first slide part having a first lock part and configured to be movable, a second slide part having a second lock part and configured to support the first slide part and be movable independently from the first slide part, and a lock arm part configured to be movable in a direction intersecting with the first slide part and the second slide part and engage with the first lock part and the second lock part at a locking position to prevent the first slide part and the second slide part from moving.

15 Claims, 51 Drawing Sheets

LOCKING DEVICE, ELECTRONIC DEVICE, AND LOCKING METHOD

CROSS-REFERENCE TO RELATED APPLICATIONS

The present application is a U.S. continuation application filed under 35 USC 111(a) claiming benefit under 35 U.S.C. 120 and 365(c) of PCT International Application No. PCT/JP2009/070785 filed on Dec. 11, 2009, the entire contents of which are incorporated herein by reference.

FIELD

The disclosures discussed herein relate to a locking structure to lock a coupling of a mobile computer and an electronic device, such as a port replicator or a docking station, and particularly relates to a locking device, an electronic device and a locking method to prevent the mobile computer from being removed from the electronic device by utilizing a locking member such as an anti-theft wire plug.

BACKGROUND

A mobile computer is configured to be attached to or detached from an electronic device that serves as a functional expansion such as a port replicator or a docking station to facilitate the functional expansion or wire connection of the mobile computer. The port replicator generally includes connectors of a mobile computer including input/output connectors such as a PS/2, a USB port and an external display output port in addition to other connectors that are unnecessary while the mobile computer is carried by a user outside. The docking station includes drive devices such as a CD-ROM drive device and an expansion slot.

As an example of such an electronic device for a functional expansion, there is disclosed an electronic device having a locking structure to lock a coupling of a mobile computer and a docking station utilizing a latch structure (Patent Document 1).

RELATED ART DOCUMENT

Patent Document

[Patent Document 1] Japanese Laid-open Patent Publication No. 2006-127522

In view of portability of the mobile computer, the mobile computer may need to be easily attached to or detached from the electronic device, and reliability in coupling of connectors between the mobile computer and the electronic device may need to be maintained in the coupling between the mobile computer and the electronic device.

Further, the mobile computer may be prevented from being stolen by incorporating the locking structure into the coupling between the mobile computer and the electronic device. However, it is generally known that such a coupling structure or a locking structure may be easily uncoupled or unlocked by skilled persons with familiar tools.

SUMMARY

According to an aspect of an embodiment, there is provided a locking device that includes a first slide part having a first lock part and configured to be movable; a second slide part having a second lock part and configured to support the first slide part and be movable independently from the first slide part; and a lock arm part configured to be movable in a direction intersecting with the first slide part and the second slide part and engage with the first lock part and the second lock part at a locking position to prevent the first slide part and the second slide part from moving.

It is to be understood that both the foregoing general description and the following detailed description are exemplary and explanatory and are not restrictive of the invention as claimed.

Other objects, features, and advantages of the present invention will become more apparent from the following detailed description when read in conjunction with the accompanying drawings.

DESCRIPTION OF EMBODIMENTS

First Embodiment

A first embodiment provides an example of a locking device that includes a locking unit having an attaching/detaching mechanism and a locking mechanism.

Figure 1:
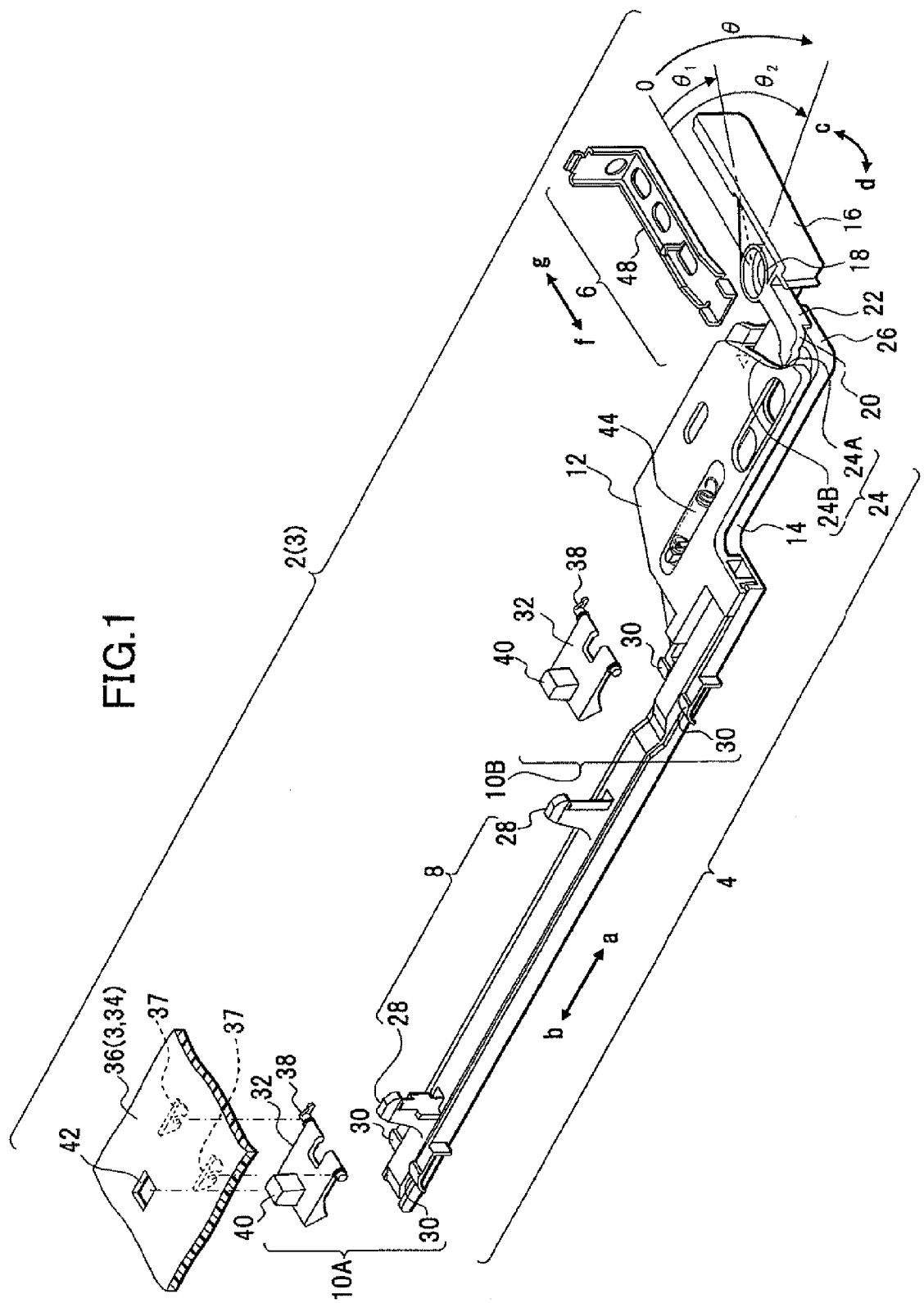
FIG. 1 is a perspective view illustrating an example of a locking unit according to a first embodiment.

The first embodiment is described with reference to FIG. 1. FIG. 1 is a view illustrating a locking unit according to a first embodiment. A configuration of the locking unit illustrated in FIG. 1 is one example and hence, the present invention may not be limited to such a configuration.

A locking unit 2 represents examples of a locking device, an electronic device and a locking method. As illustrated in FIG. 1, the locking unit 2 includes an attaching/detaching mechanical part 4 and a locking mechanical part 6.

Figure 19:
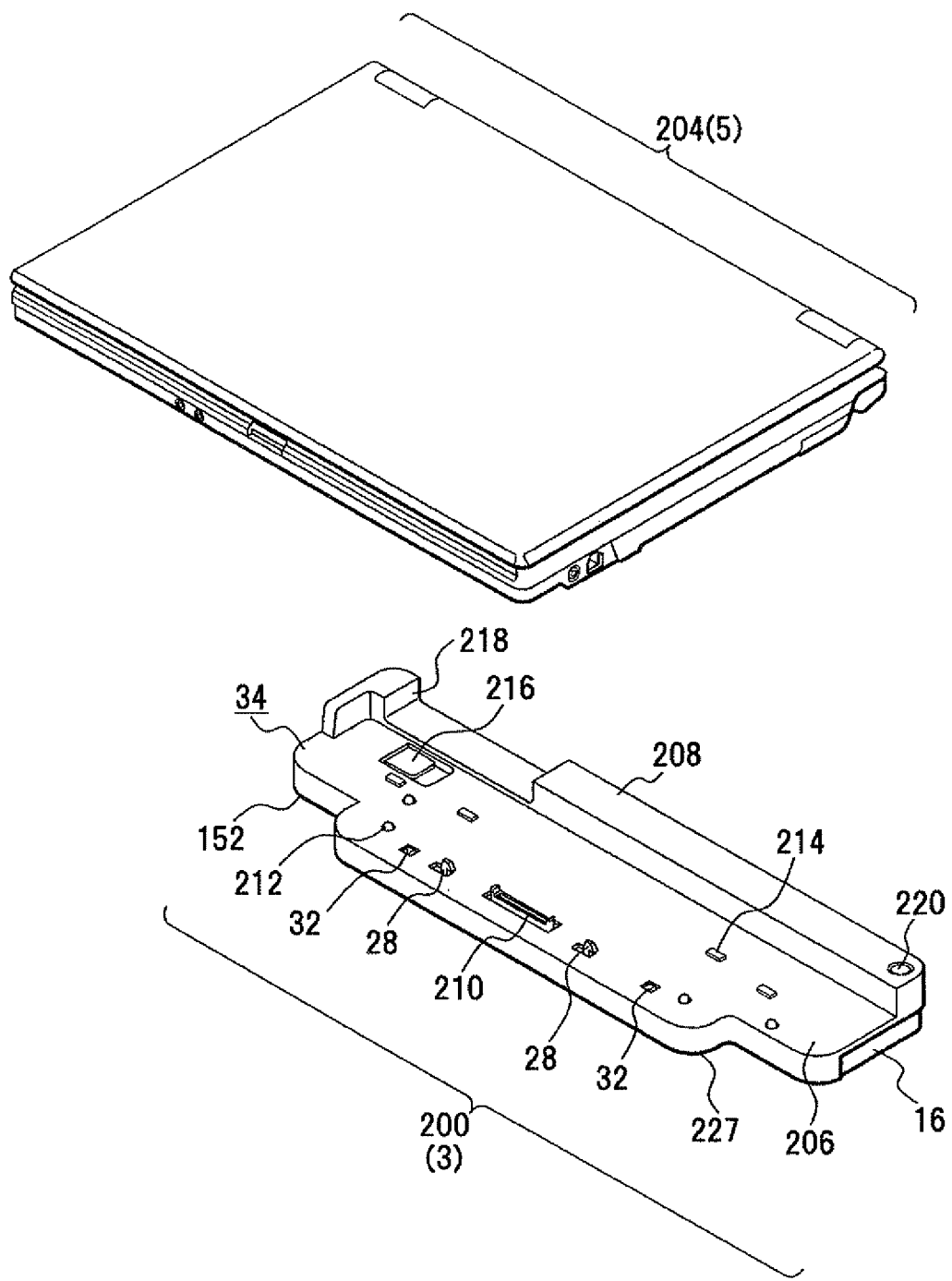
FIG. 19 is a perspective view illustrating a mobile computer and a port replicator according to a second embodiment.

The attaching/detaching mechanical part 4 is configured to attach or detach a first device 3 (e.g., a port replicator 200 illustrated in FIG. 19) having the locking unit 2 and a second device 5 (e.g., a mobile computer 204 illustrated in FIG. 19).

The attaching/detaching mechanical part 4 includes a constraining mechanical part 8, and lifting mechanical parts 10A and 10B. The constraining mechanical part 8 is configured to couple the first device 3 and the second device 5 to constrain the first device 3 and the second device 5, and to release the constrained first device 3 and second device 5. Further, the lifting mechanical parts 10A and 10B are lifted up to allow the lifting mechanical parts 10A and 10B to be in a disengaged state when the constrained first and second devices 3 and 5 are released.

The attaching/detaching mechanical part 4 includes a first slide part 12, a second slide part 14 and a lever part 16.

The slide parts 12 and 14 may, for example, be formed of synthetic resin and configured to be slidably maintained in double arrow a-b directions. A sliding mechanism is formed of the slide part 12 slidably disposed on the slide part 14. The lever part 16 may, for example, be formed of synthetic resin and configured to rotate in double arrow c-d directions based on a lever support shaft 18 serving as a fulcrum point. The lever part 16 illustrated in FIG. 1 is situated at a starting position (an angle θ=0).

The lever part 16 includes a first rod part 20 and a second rod part 22 around the lever support shaft 18 on the slide parts 12 and 14 side. The slide part 12 includes a cam part 24 at its end portion, and the cam part 24 is configured to engage with the rod part 20. The slide part 14 includes a cam part 26 at its end portion, and the cam part 26 is configured to engage with the rod part 22. Specifically, a cam mechanism is formed of the rod parts 20 and 22 of the lever part 16 and the cam parts 24 and 26. The cam part 24 includes an applicative part 24A configured to come in contact with the rod part 20 to receive force from the rod part 20, and a release part 24B configured to release the rod part 20. Each of the rod parts 20 and 22 rotates by rotation of the lever part 16. If rotational radii of the rod parts 20 and 22 are $r_1$ and $r_2$ (see FIG. 2), $r_1 > r_2$ is established. If central angles of the rotational center 0 of the lever part 16 are $\beta_1$ and $\beta_2$ (see FIG. 2), $\beta_1 > \beta_2$ is established. Thus, the rod part 20 side angle is advanced in a clockwise direction. That is, the rod part 22 is situated at a position retracted from the rod part 20 in a clockwise direction.

When the lever part 16 is rotated from θ=0 to θ=θ$_1$ in a clockwise direction, a front end of the rod part 20 comes in contact with the cam part 24 to move the slide part 12 in an arrow b direction from the starting position. Further, when the lever part 16 is rotated from θ=θ$_1$ to θ=θ$_2$ in a clockwise direction, a front end of the rod part 22 comes in contact with the cam part 26 to move the slide part 14 in an arrow b direction from the starting position. Specifically, the rotational angle θ of the lever part 16 allows the slide parts 12 and 14 to start sliding at different timing.

The slide part 12 includes a pair of hook parts 28 formed on its upper surface at a predetermined interval. The slide part 14 includes lifting operation parts 30 of the lifting mechanical parts 10A and 10B formed at a predetermined interval to sandwich the pair of hook parts 28. Each of the slide parts 12 and 14 is a compact made of synthetic resin. In this embodiment, the hook parts 28 and the lifting operation parts 30 are situated at positions such that the hook parts 28 will not come in contact with the lifting operation parts 30.

The lifting mechanical parts 10A and 10B include the lifting operation parts 30, which are configured to lift up the device 5 from the device 3 when the device 5 placed on the device 3 is unlocked by the locking unit 2. The lifting mechanical parts 10A and 10B include lifting parts 32 as lift-up parts corresponding to the lifting operation parts 30. In this case, an upper case part 36 is provided on a main body part 34 of the device 3, which is provided with the locking unit 2. The upper case part 36 includes bearings 37 on which the lifting operation parts 30 are rotationally supported by a support shaft 38. When the lifting operation parts 30 are not operated; that is, when the lifting operation parts 30 are not brought into contact with the lifting parts 32, the lifting parts 32 may be maintained in a downward state due to their own weight. Each of the lifting parts 32 includes a lifting projection 40, which projects from a window 42 of the upper case part 36 when the lifting projection 40 is not operated by the lifting operation part 30. This is called a "lifted state".

Figure 2:
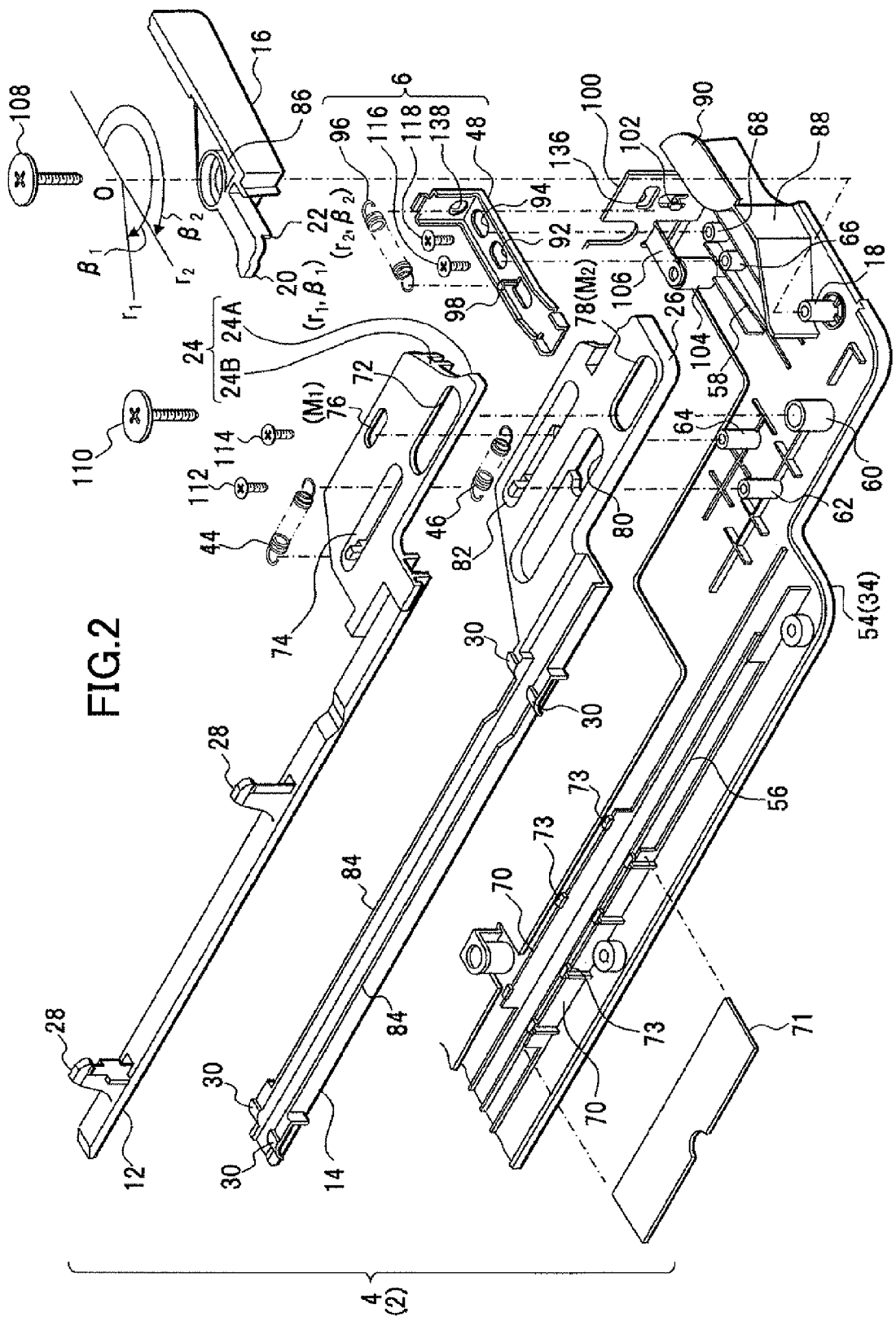
FIG. 2 is an exploded perspective view illustrating the locking unit.

In such an attaching/detaching mechanical part 4, when the lever 16 is situated at the starting position (θ=0), the slide part 12 receives restoring force from a spring 44 and the slide part 14 receives restoring force from a spring 46 (see FIG. 2). Accordingly, each of the slide parts 12 and 14 may be maintained at the starting position. The starting position allows the hook parts 28 to be maintained at constraint positions and the lifting operation parts 30 are maintained at the retracted positions of the lifting parts 32. When the lever part 16 is rotated to the position θ=θ$_1$, the slide part 12 moves in the arrow b direction and the hook parts 28 move to respective positions at which the hook parts 28 release the constraint state. This is called a "constraint released state".

Further, when the rotation of the lever part 16 is advanced to the position θ=θ$_2$, the respective lifting operation parts 30 come in contact with the lifting parts 32. As the rotation of the lever part 16 is advanced, the height of the lifting projection 40 projected from the upper case part 36 is increased. This releases the device 5 from the constraint of the hook part 28 to lift up the device 5.

When the lever part 16 in this state is moved back to the position θ=0, the slide part 12 receives restoring force from the spring 44 and the slide part 14 receives restoring force from the spring 46. As a result, the slide parts 12 and 14 are moved in the arrow a direction by the restoring force of the spring 46 such that the slide parts 12 and 14 are moved back to the starting position. Since the lifting projection 40 receives the weight of the device 5, the lifting projection 40 is allowed to move downward together with the lifting part 32. In this case, the hook parts 28 are returned to the constraint position. That is, the hook parts 28 are in the constraint state again. Thus, in order to make the device 5 constrained, the constraint state of the device 5 may be temporarily released by operating the lever part 16 to locate the device 5, and then the lever part 16 may be moved back to the position θ=0.

The locking mechanical part 6 is a mechanism to prevent the slide parts 12 and 14 from moving by locking the slide parts 12 and 14 at the constrained position when the slide parts 12 and 14 are in the constraint state; that is, when they are constrained at the starting position. The locking mechanical part 6 includes a lock arm part 48 movable in double arrow f-g directions and in a direction intersecting with the slide parts 12 and 14. The sliding of the slide parts 12 and 14 is locked at the starting position by moving the lock arm part 48 in the arrow f direction so that the lock arm part 48 is engaged with lock parts 50 and 52 (see FIG. 4) of the sliding parts 12 and 14. The lock part 52 includes a recess 53 (see FIG. 4) and the lock part 50 is inserted in the recess 53. Thus, the lock parts 50 and 52 are integrated and unitarily locked by the lock arm part 48. The rotational operation of the lever part 16 is stopped by the locking of the lock parts 50 and 52. In this locked state, the attaching/detaching mechanical part 4 is maintained at the starting position and the device 5 is in the constraint state. When the lock arm part 48 is moved in the arrow g direction to disengage the lock parts 50 and 52 (see FIG. 4) of the sliding of the slide parts 12 and 14, the lock parts 50 and 52 that have been locked by the lock arm part 48 are released.

Subsequently, the configuration of the locking unit 2 is described with reference to FIG. 2. FIG. 2 is an exploded perspective view illustrating the locking unit 2. In FIG. 2, components similar to those illustrated in FIG. 1 are provided with the same reference numerals.

The locking unit 2 includes a lower case part 54 of the main body part 34. The lower case part 54 may, for example, be a synthetic resin compact, and include rail parts 56 and 58, slide support shafts 60, 62 and 64, lock arm support shafts 66 and 68, and a lever support shaft 18 vertically disposed on the lower case part 54.

The rail part 56 is formed of ribs on the lower case part 54 and slidably supports the slide part 14. A pair of guide walls 70 are disposed in parallel at a predetermined interval that is wider than a width of the slide part 14 on the rail part 56. Each of the guide walls 70 is configured to guide the sliding of the slide part 14. Plural cover fix parts 73 configured to fix a cover part 71 are formed on top of the guide walls 70. The cover part 71 is fixed to the cover fix parts 73 such that the cover part 71 covers the guide walls 70 and the slide parts 12 and 14. Hence, the slide parts 12 and 14 are prevented from coming off of the rail part 56.

The slide support shafts 60, 62 and 64 serve as supporting units of the slide parts 12 and 14. The slide part 12 includes slide holes 72, 74 and 76 formed of oblong holes and the slide part 14 includes slide holes 78, 80 and 82 formed of oblong holes. The slide parts 12 and 14 are slidably supported by the slide support shafts 60, 62 and 64 inserted into the corresponding slide holes 72, 74 and 76 and also into the corresponding slide holes 78, 80 and 82. In this case, the slide part 12 is restricted in its slide length by a longitudinal diameter $M_1$ of the slide hole 76, and the slide part 14 is restricted in its slide length by a longitudinal diameter $M_2$ of the slide hole 78. Thus, an accuracy in a sliding direction of the slide part 14 may be improved based on an engagement relationship between the slide support shafts 60, 62 and 64 and the slide holes 78, 80 and 82, and an engagement relationship between the rail part 56 and the slide part 14. Further, the sliding of the slide part 12 is guided by a pair of guide walls 84 formed on the slide part 14.

The slide part 12 is provided with the spring 44 and the slide part 14 is provided with the spring 46. One end of the spring 44 is fixed to the slide part 12 and the other end of the spring 44 is fixed to the slide support shaft 62. Restoring force of the spring 44 is applied in a contract direction of the spring 44 between the slide part 12 and the slide support shaft 62. As a result, the slide part 12 is maintained by the restoring force of the spring 44 at a position (the starting position) at which the slide hole 72 comes in contact with the slide support shaft 60.

One end of the spring 46 is fixed to the slide part 14 and the other end of the spring 46 is fixed to the slide support shaft 64. Restoring force of the spring 46 is applied in a contract direction of the spring 46 between the slide part 14 and the slide support shaft 64. As a result, the slide part 14 is maintained by the restoring force of the spring 46 at a position (the starting position) at which the slide hole 78 comes in contact with the slide support shaft 60.

The lever part 16 is rotationally attached to the lever support shaft 18. The lever part 16 includes a bearing 86 attached to the lever support shaft 18. A stand wall 88 is formed adjacent to the lever support shaft 18 along a setting position of the lever part 16. A cover part 90 is formed on top of the stand wall 88.

The lock arm support shafts 66 and 68 serve as supporting units of the lock arm part 48, and are inserted into slide holes 92 and 94 of the lock arm part 48. The lock arm part 48 is slidably supported on a rail part 58.

The lock arm part 48 includes a spring 96. One end of the spring 96 is fixed to a latch part 98 of the lock arm part and the other end of the spring 96 is fixed to a latch part 102 of a rear panel part 100. Restoring force of the spring 96 is applied in a contract direction of the spring 96 between the lock arm part 48 and the rear panel part 100 (see FIG. 4). As a result, the lock arm part 48 is maintained by the restoring force of the spring 96 at positions at which the slide holes 92 and 94 come in contact with the slide support shafts 66 and 68.

The rear panel part 100 may, for example, be formed of a metal plate, and the latch part 102 may be formed of a lug of the metal plate. A fix piece 106 projected from the rear panel part 100 is fixed to a fix projection 104 formed on the lower case part 54 in a projected manner.

Further, a fixation screw 108 fixed to the lever support shaft 18, fixation screws 110, 112 and 114 fixed to the slide support shafts 60, 62 and 64, and fixation screws 116 and 118 fixed to the lock arm support shafts 66 and 68 are provided.

Figure 3:
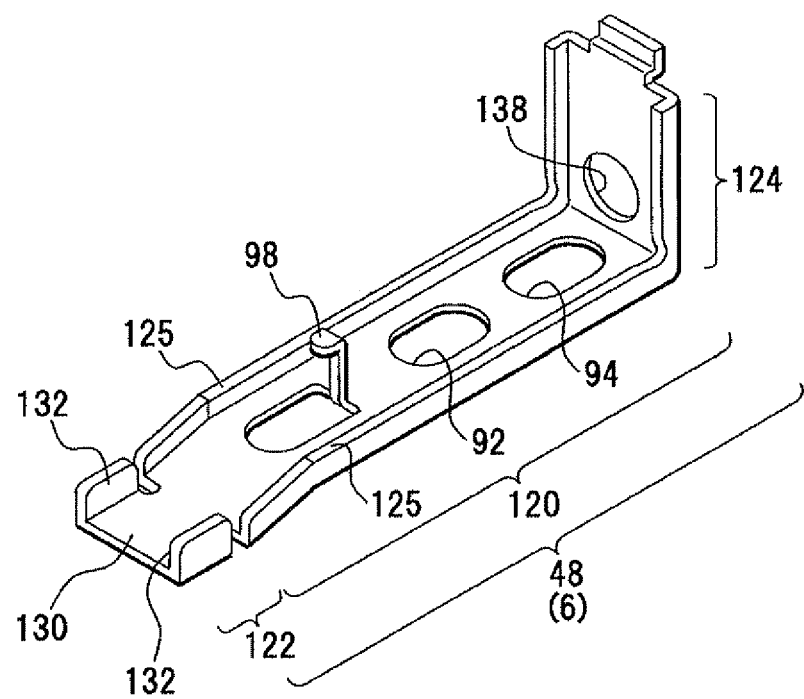
FIG. 3 is a perspective view illustrating an example of a lock arm part.

The lock arm part 48 is described with reference to FIG. 3. FIG. 3 illustrates an example of the lock arm part 48.

Figure 4:
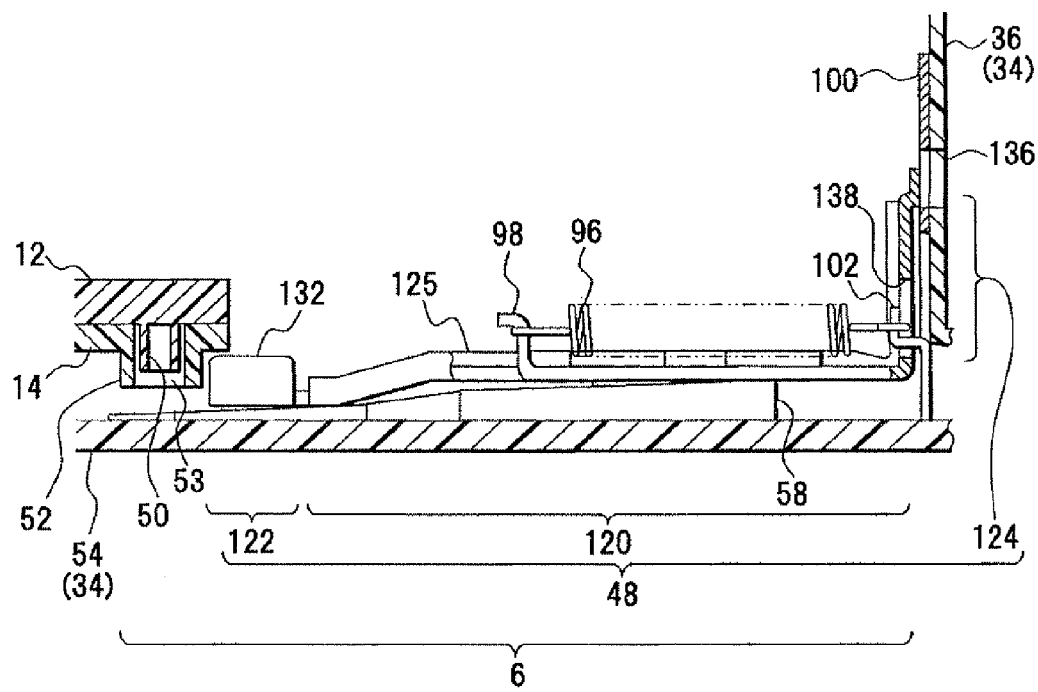
FIG. 4 is a view illustrating a locking mechanical part.

The lock arm part 48 may, for example, be formed of a metal plate. The lock arm part 48 includes a main body part 120, a restraining part 122 and an operation part 124, and ribs 125 are formed on respective edges of the main body part 120, the restraining part 122 and the operation part 124 for enhancing the strength of the lock arm part 48 as well as reducing its weight. The main body part 120 is supported by the rail part 58 (see FIG. 2) and located at an interval between the operation part 124 and the restraining part 122. The main body part 120 includes the slide holes 92 and 94 into which the lock arm support shafts 66 and 68 are inserted, and the latch part 98 configured to latch the spring 96. The spring 96 is an example of a holding unit to detach the lock arm part 48 from the lock parts 50 and 52 and hold the detached lock arm part 48 (FIG. 4).

The restraining part 122 is formed in a front end of the main body part 120 and configured to restrain the lock parts 50 and 52 (see FIG. 4) unitarily. Specifically, the restraining part 122 includes a rectangular flat part 130 extended from the main body part 120 and the pair of stand walls 132 formed by folding the flat part 130 upwardly in an "L" shape. The flat part 130 and a pair of the stand walls 132 form an L shape frame.

Further, the operation part 124 is formed at a rear end of the main body part 120 and configured to perform the operation from a lock window 136 (see FIG. 2) of the rear panel part 100. The operation part 124 includes a through hole 138 for allowing the spring 96 to pass through it.

Figure 5:
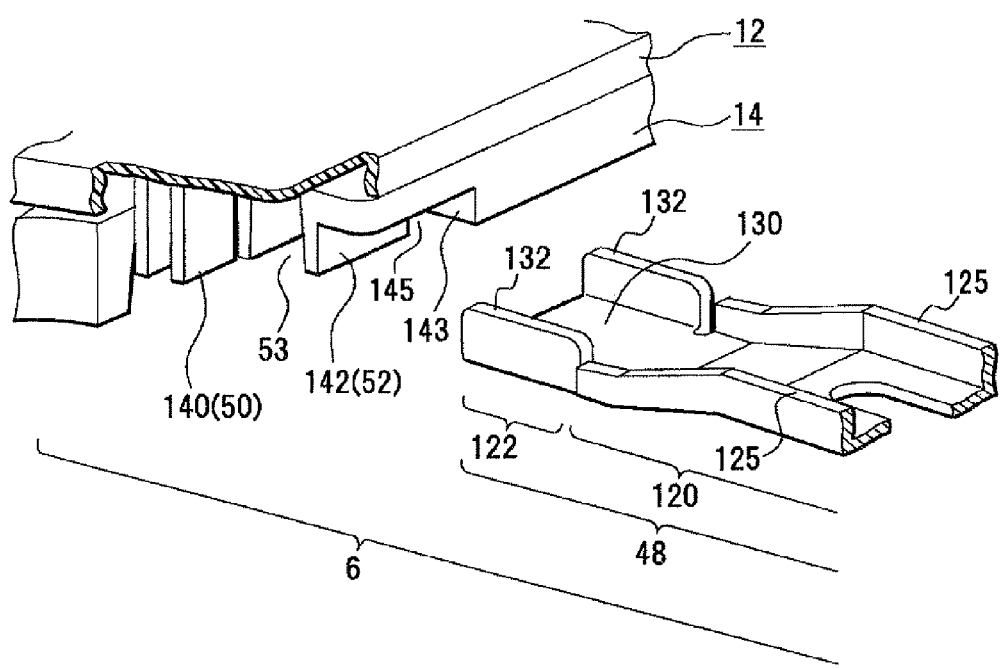
FIG. 5 is a view illustrating slide parts and the lock arm part in a pre-locked state.
Figure 6:
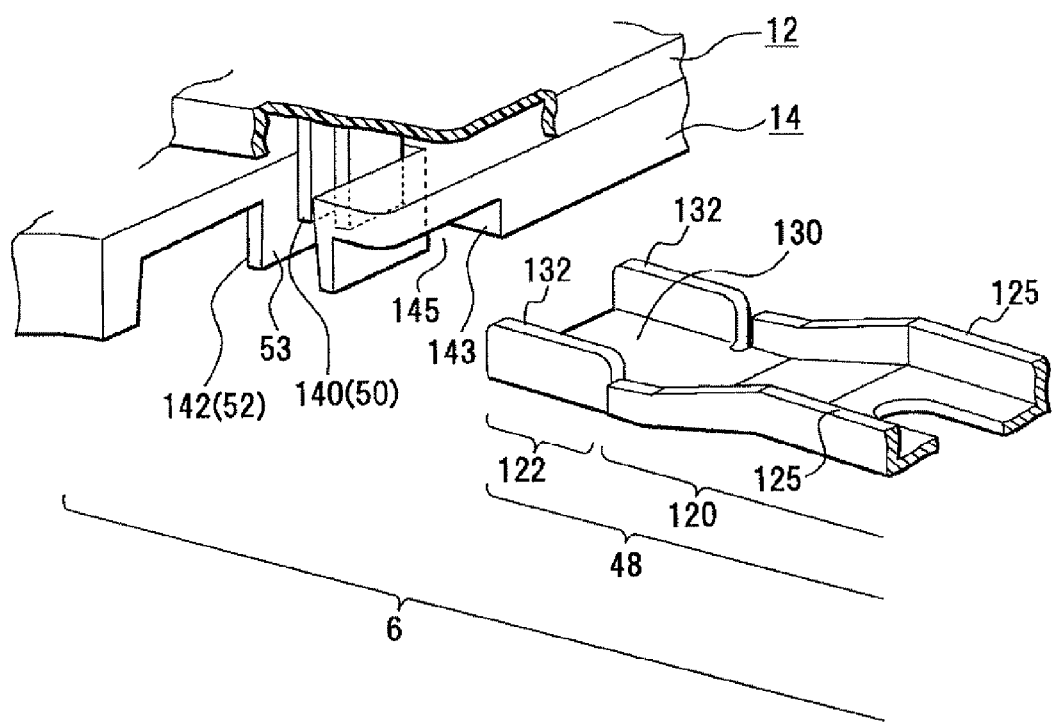
FIG. 6 is a view illustrating the slide parts and the lock arm part in the pre-locked state.
Figure 7:
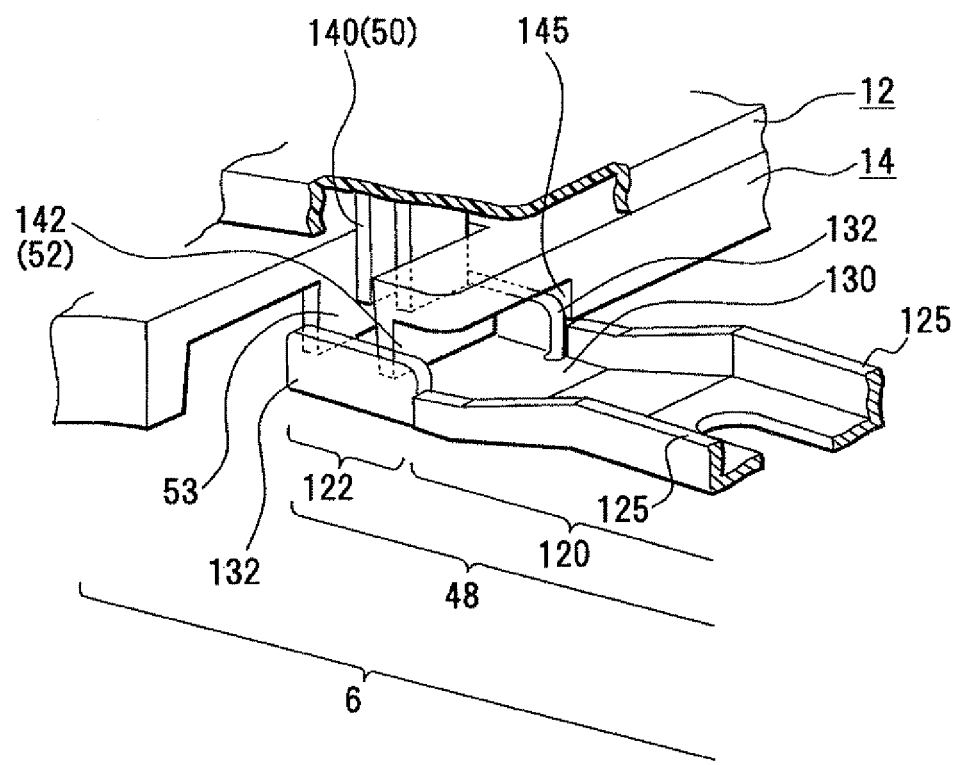
FIG. 7 is a view illustrating the slide parts and the lock arm part in a locked state.
Figure 8:
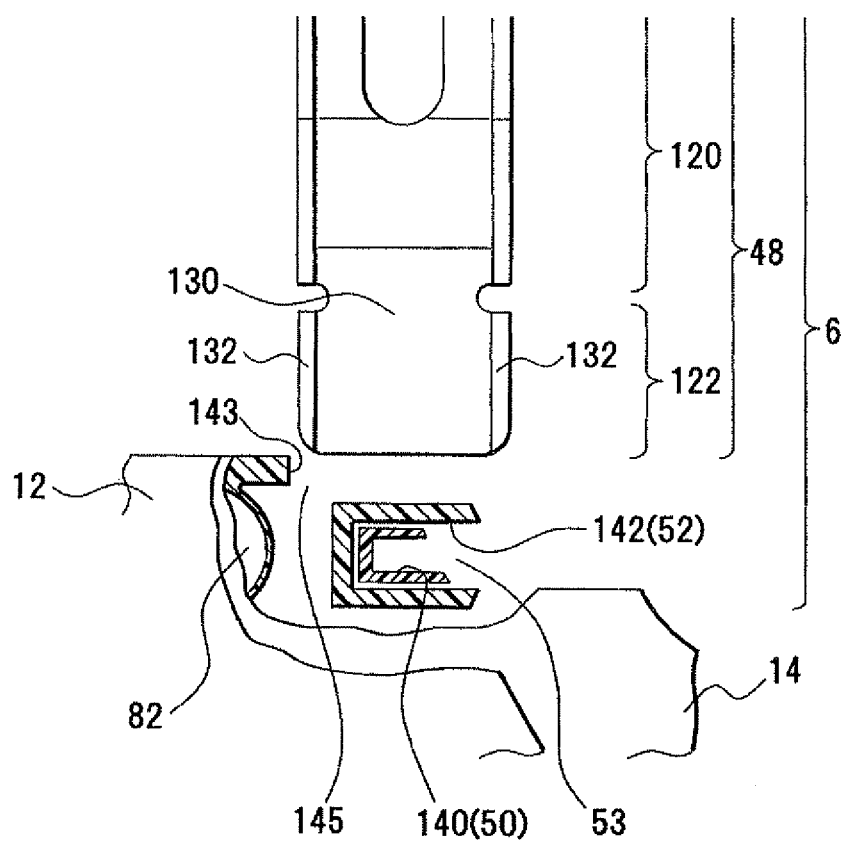
FIG. 8 is a view illustrating the slide parts and the lock arm part in the pre-locked state.
Figure 9:
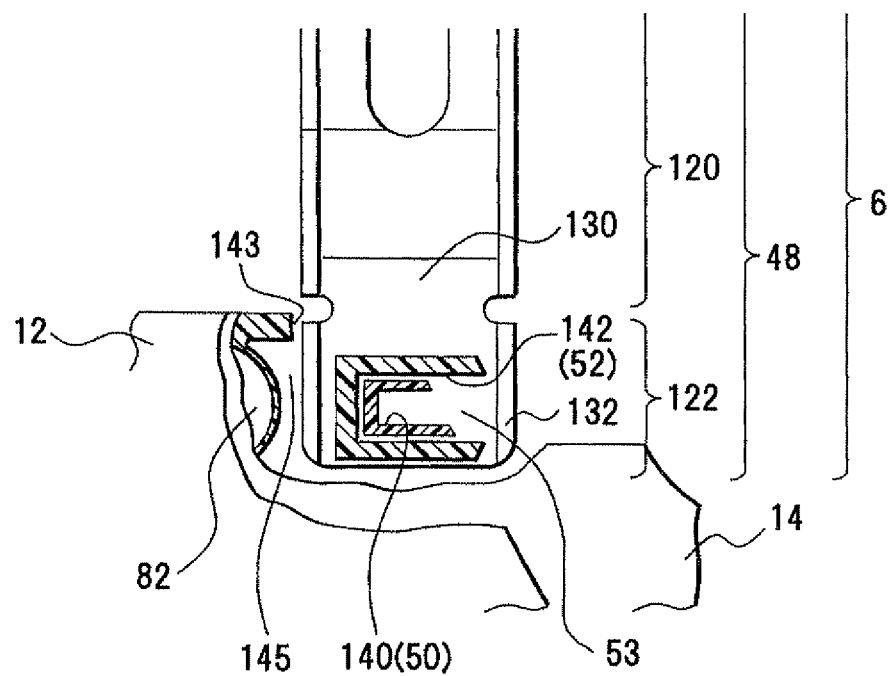
FIG. 9 is a view illustrating the slide parts and the lock arm part in the locked state.

Subsequently, the locking mechanical part 6 and its locking operations are described with reference to FIGS. 4, 5, 6, 7, 8 and 9. FIG. 4 is a view illustrating an example of the locking mechanical part 6. FIG. 5 is a view illustrating the lock parts 50 and 52 of the locking mechanical part 6 that are moving from the starting position. FIG. 6 is a view illustrating the lock parts 50 and 52 of the locking mechanical part 6 that are situated at the starting position. FIG. 7 is a view illustrating the lock parts 50 and 52 of the locking mechanical part 6 that are in a locked state. FIG. 8 is a view illustrating a pre-locked state. FIG. 9 is a view illustrating a locked state.

The locking mechanical part 6 is configured to unitarily lock the lock part 50 of the slide part 12 and the lock part 52 of the slide part 14 when the lock part 50 of the slide part 12 and the lock part 52 of the slide part 14 reach the locking position, that is, a moving starting point.

In this embodiment, the lock part 50 is formed of a rib 140 having a "C-shaped" cross-section and projected from a lower surface of the slide part 12. The lock part 52 is formed of a tubular rib 142 having a "C-shaped" cross-section and projected from a lower surface of the slide part 14. The slide part 14 having the rib 142 further includes a stand wall 143 and a gap 145 is formed between the rib 142 and the stand wall 143. The stand wall 143 serves as a reinforcement unit configured to reinforce the slide part 14. The gap 145 serves as a receiving unit configured to receive one of the stand walls 132 of the restraining part 122 of the lock arm part 48. Since the gap 145 is formed between the rib 142 and the stand wall 143, the rib 142 may be capable of being inserted between the stand walls 132 of the restraining part 122 of the lock arm part 48. With this configuration, when the lock parts 50 and 52 are located at the moving starting point; that is, when the lock parts 50 and 52 are located at the locking position, the lock part 50 is inserted inside the lock part 52. In the locked state, the rib 140 that has been inserted inside the rib 142 is in the constraint state, which increases the coupling strength and makes the locked state difficult to disengage.

Further, the lock arm part 48 is retracted toward the rear panel part 100 side by restoring force of the spring 96 in a contract direction, and the operation part 124 of the lock arm part 48 is brought into contact with the rear panel part 100. At this moment, the restraining part 122 of the lock arm part 48 resides in a position distant from each of the lock parts 50 and 52 as illustrated in FIGS. 5, 6 and 8, and hence, the slide parts 12 and 14 may be slidably moved without restriction.

In this embodiment, the upper case part 36 is placed on a rear surface side of the rear panel part 100, and the upper case part 36 includes a lock window 136 formed in common with the rear panel part 100.

In this case, the restraining part 122 of the lock arm part 48 becomes a locked state from the state illustrated in FIGS. 5, 6 and 8, such that the restraining part 122 of the lock arm part 48 is engaged with the lock parts 50 and 52 of the slide parts 12 and 14. That is, the ribs 140 and 142 of the lock parts 50 and 52 are constrained between the stand walls 132 of the restraining part 122. The movements of the slide parts 12 and 14 become restrained, and hence, the slide parts 12 and 14 are in the constraint state.

Figure 10:
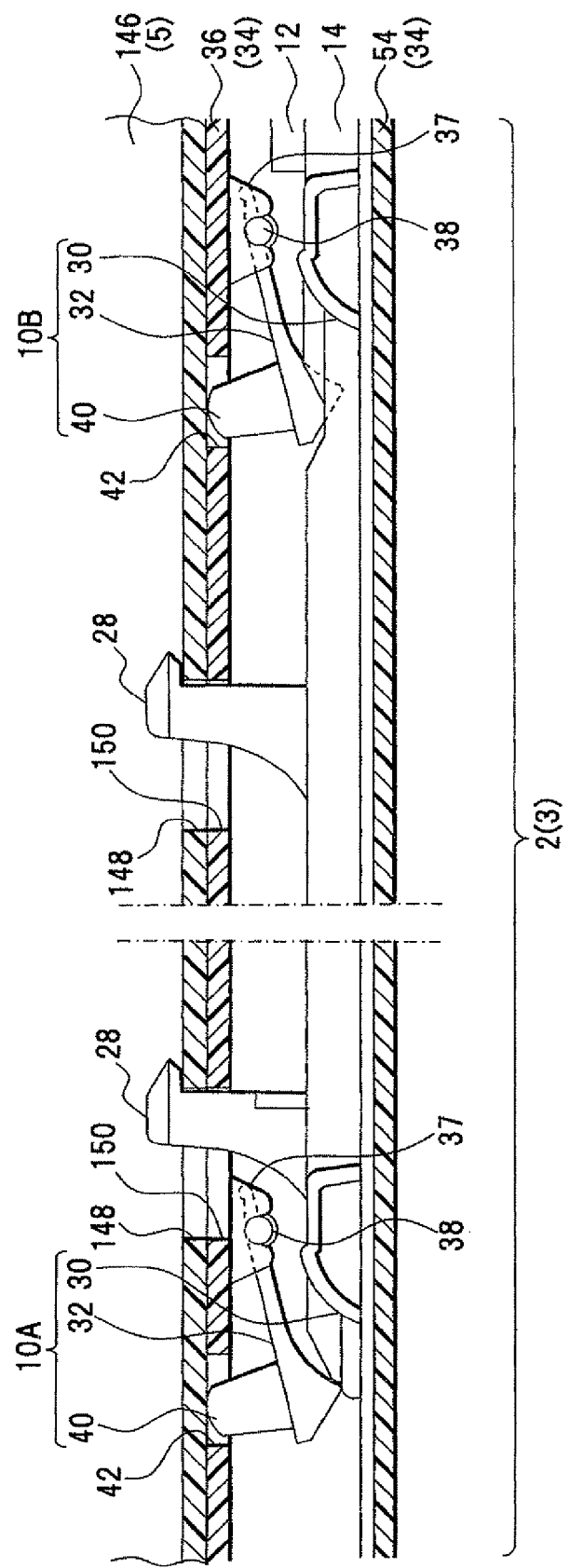
FIG. 10 is a view illustrating a state in which an angle of a lever part is $\theta=0$.
Figure 11:
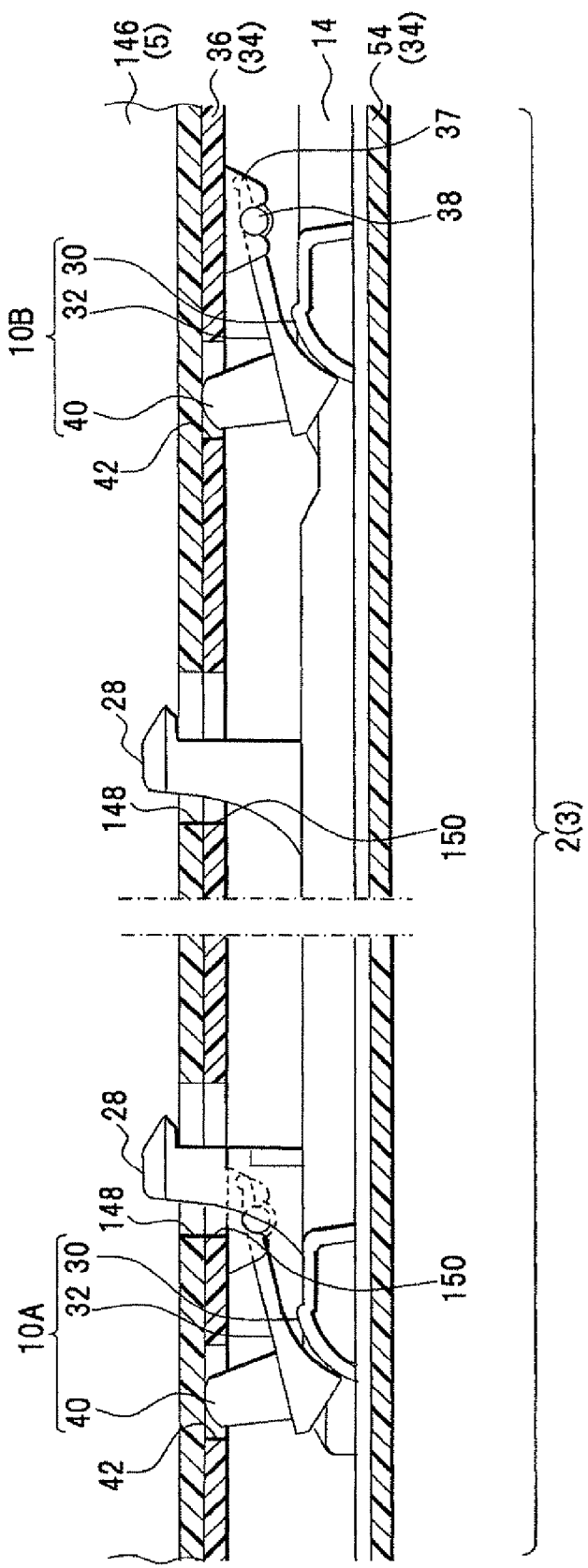
FIG. 11 is a view illustrating a state in which the angle of the lever part is $\theta=\theta_1$.
Figure 12:
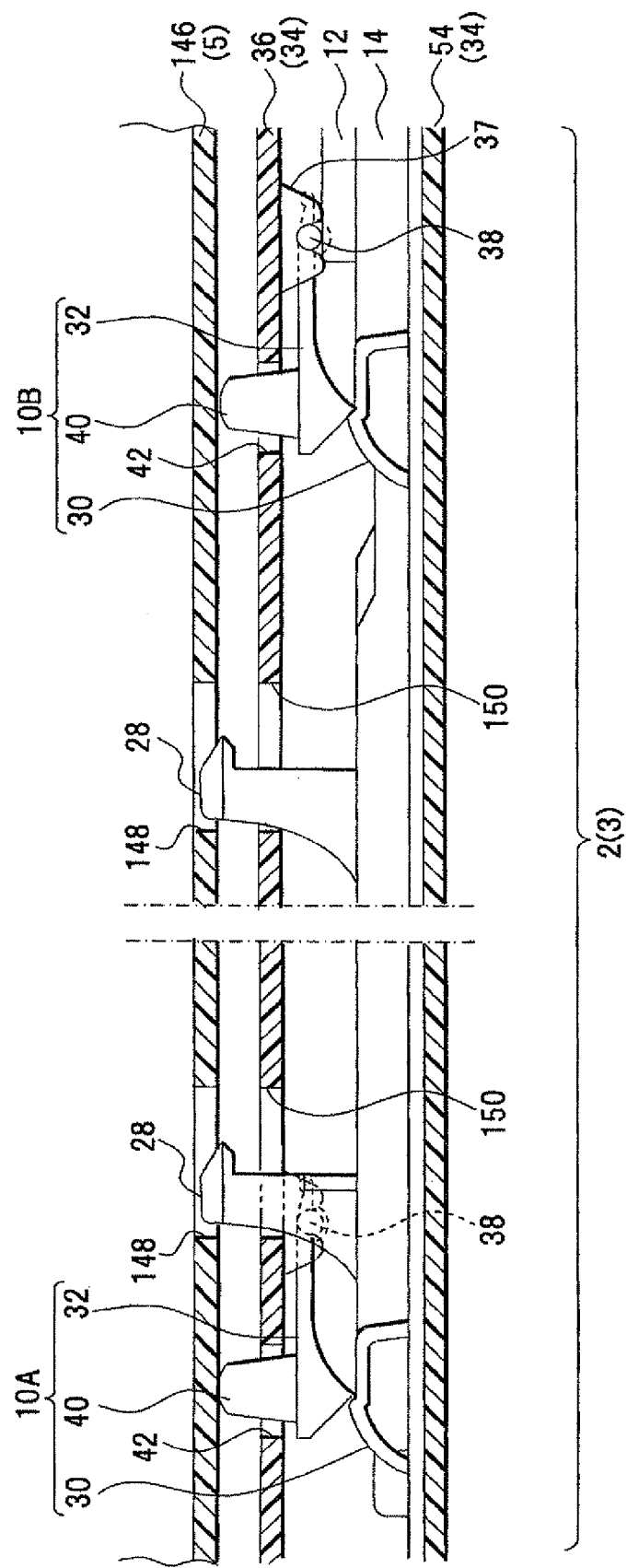
FIG. 12 is a view illustrating a state in which the angle of the lever part is $\theta \leq \theta_2$.
Figure 13:
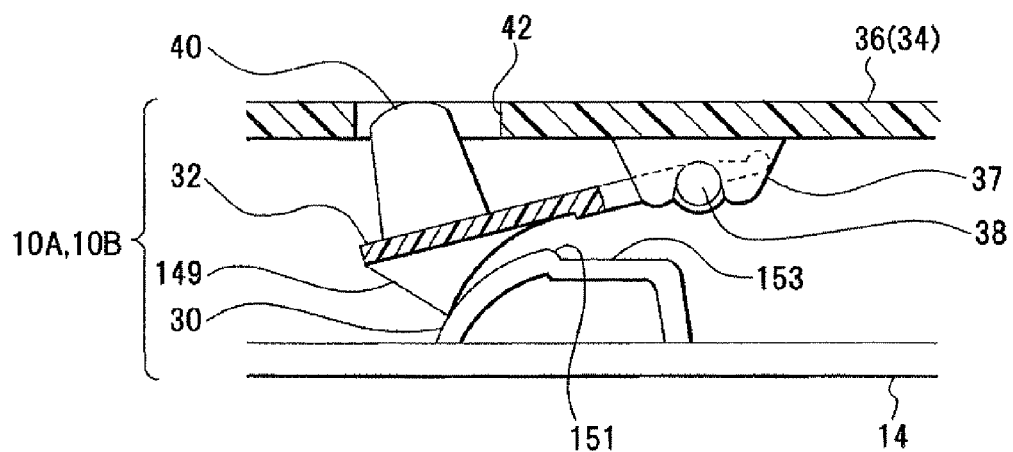
FIG. 13 is a view illustrating a lifting operation of a lifting mechanical part.
Figure 14:
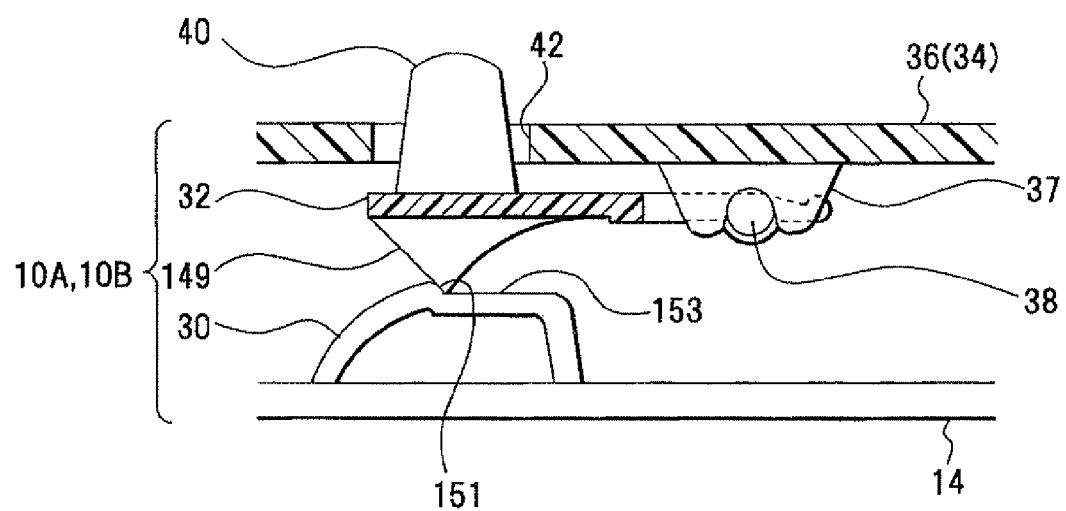
FIG. 14 is a view illustrating a lifting operation of the lifting mechanical part.

Next, attaching and detaching operations are described with reference to FIGS. 10, 11, 12, 13 and 14. FIG. 10 is a view illustrating a state in which an angle $\theta=0$. FIG. 11 is a view illustrating a state in which an angle $\theta=\theta_1$. FIG. 12 is a view illustrating a state in which an angle $\theta \leq \theta_2$. FIGS. 13 and 14 are views illustrating operations of the lifting parts 32.

(1) Angle State: $\theta=0$

In this state, as illustrated in FIG. 10, the slide parts 12 and 14 are maintained at the moving starting point and the hook parts 28 are coupled with fixation holes 148 formed in the lower case part 146 of the device 5 to lock the device 5. As a result, the locking unit 2 and the device 5 are in a fixed state. In this case, the lifting projections 40 are maintained at the retracted position.

(2) Angle State: $0<\theta \leq \theta_1$

In this state, as illustrated in FIG. 11, the slide parts 12 and 14 are moved in the arrow b direction (see FIG. 1) from the moving start point, so that the hook parts 28 are disengaged from the device 5. In this case, although the slide part 14 is moved with the slide part 12, the lifting projections 40 still reside in the retracted position and are projected. When the lever part 16 reaches the angle $\theta=\theta_1$, the slide hole 72 of the slide part 12 comes in contact with the slide support shaft 60.

Thus, the lever part 16 is stopped from further moving and the lever part 16 is in a stationary state.

(3) Angle State: $\theta_1 < \theta \leq \theta_2$

As illustrated in FIG. 12, when the lever part 16 is rotated from the angle $\theta = \theta_1$ to the angle $\theta \leq \theta_2$, the slide part 14 is further moved in the arrow b direction from the moving start point while the hook parts 28 being disengaged from the device 5. When the lever part 14 is at the angle $\theta = \theta_2$, the edge of the slide hole 78 of the slide part 14 comes in contact with the slide support shaft 60 to stop the movement of the slide part 14. Each of the lifting part 32 is operated by the movement of the slide part 14 to advance the lifting projections 40 before the movement of the slide part 14 becomes stationary. The device 5 is disengaged from the locking unit 2 by the projected amounts of the lifting projections 40.

As illustrated in FIG. 13, when the slide part 14 is moved, the lifting operation part 30 comes in contact with a projection 149 of the lifting part 32. For example, the lifting operation part 30 is formed on an outwardly curved surface so that the lifting operation part 30 is raised along the outwardly curved surface as the slide part 14 moves. As a result, the lifting part 32 is rotated in a clockwise direction around the support shaft 38 serving as a fulcrum point so that the lifting projection 40 is raised and projected from the window 42 as illustrated in FIG. 14.

In this case, the projection 149 may have an acute point. By contrast, the lifting operation part 30 includes a top portion and a stopper 151 is formed on a vertex of the top portion. The top portion of the lifting operation part 30 includes a flat portion 153 at a position slightly lower than the stopper 151. The projection 149 of the lifting part 32 moves beyond the stopper 151 on the vertex of the lifting operation part 30 to reach the flat portion 153, and as a result, the lifting projection 40 is in a projected state. The load applied to the lifting projection 40 is received by the flat portion 153 of the lifting operation part 30. As a result, the lifting mechanical parts 10A and 10B receive such a load so that lifting mechanical parts 10A and 10B are maintained in a lifted state. When the load is released, the slide part 14 slides back to an original position by the action of restoring force of the spring 46.

With such an configuration, the slide part 12 moves corresponding to a rotational angle of the lever part 16 to disengage the latch of the hook parts 28. Subsequently, the lifting mechanical parts 10A and 10B operate to lift up the device 5.

Figure 15:
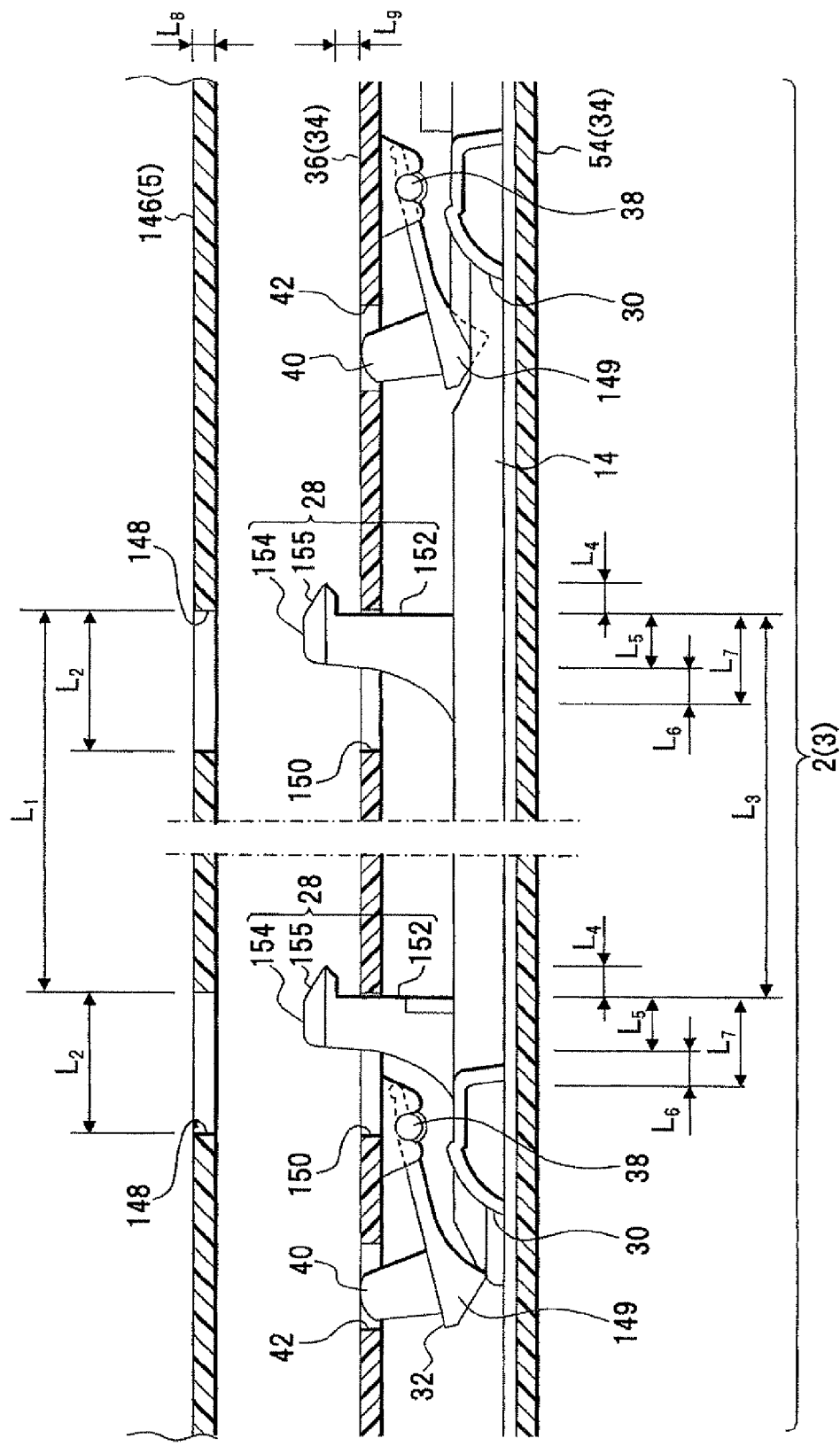
FIG. 15 is a view illustrating an attachment and detachment relationship between the locking unit and a device.

Next, an attachment/detachment relationship between the locking unit 2 and the device 5 is described with reference to FIG. 15. FIG. 15 is a view illustrating the attachment and detachment relationship between the locking unit 2 and the device 5.

$L_1$ represents an interval between the fixation holes 148 on the device 5 side into which the hook parts 28 are inserted and also represents an interval between the slide holes 150 of the upper case part on the locking unit 2 side. $L_2$ represents an opening width of each of the fixation hole 148 and the slide hole 150. Further, $L_3$ represents a setting interval of the hook parts 28 on the locking unit 2 side, and $L_4$ represents a projection length of a beak part 154 from an anterior border of a main body part 152 of the hook part 28. $L_5$ represents a width of the main body part 152 of the hook part 28 inserted into the fixation hole 148, $L_6$ represents a slide width of the hook part 28 at a rotational angle $\theta = \theta_1$ of the lever part 16, and $L_7$ represents a width obtained by adding the width $L_5$ of the main body part 152 to the slide width $L_6$.

With the above settings, the intervals $L_1$ and $L_3$ has a relationship $L_1 \approx L_3$. If $L_1 > L_3$ is set, the hook part 28 may be inserted into the fixation hole 148 so that the device 5 side and the locking unit 2 may be coupled. The relationship between the projection length $L_4$ of the beak part 154 and the slide width $L_6$ of the hook part 28 by the slide part 12 is $L_4 < L_6$. The relationship between the opening width $L_2$ of the fixation hole 148 and the slide hole 150 and the width $L_7$ obtained by adding the slide width $L_6$ and the width $L_5$ of the main body part 152 of the hook part 28 is $L_2 > L_7$.

If a thickness of the lower case part 146 is $L_8$ on the device 5 side and the interval between an upper surface of the upper case part 36 and the beak part 154 of the hook part 28 is $L_9$ in the locking unit 2 side, the relationship $L_9 \approx L_8$ and the relationship $L_9 > L_8$ may be determined.

In this case, an upper surface of the beak part 154 includes a slope part 155 corresponding to an edge of the fixation hole 148 of the lower case part 146. The slope part 155 of the hook part 28 is a sliding unit configured to receive force generated by lowering the edge of the fixation hole 148 of the lower case part 146, and slidably move the slide part 12 by the force received by the slope part 155 of the hook part 28.

Figure 16:
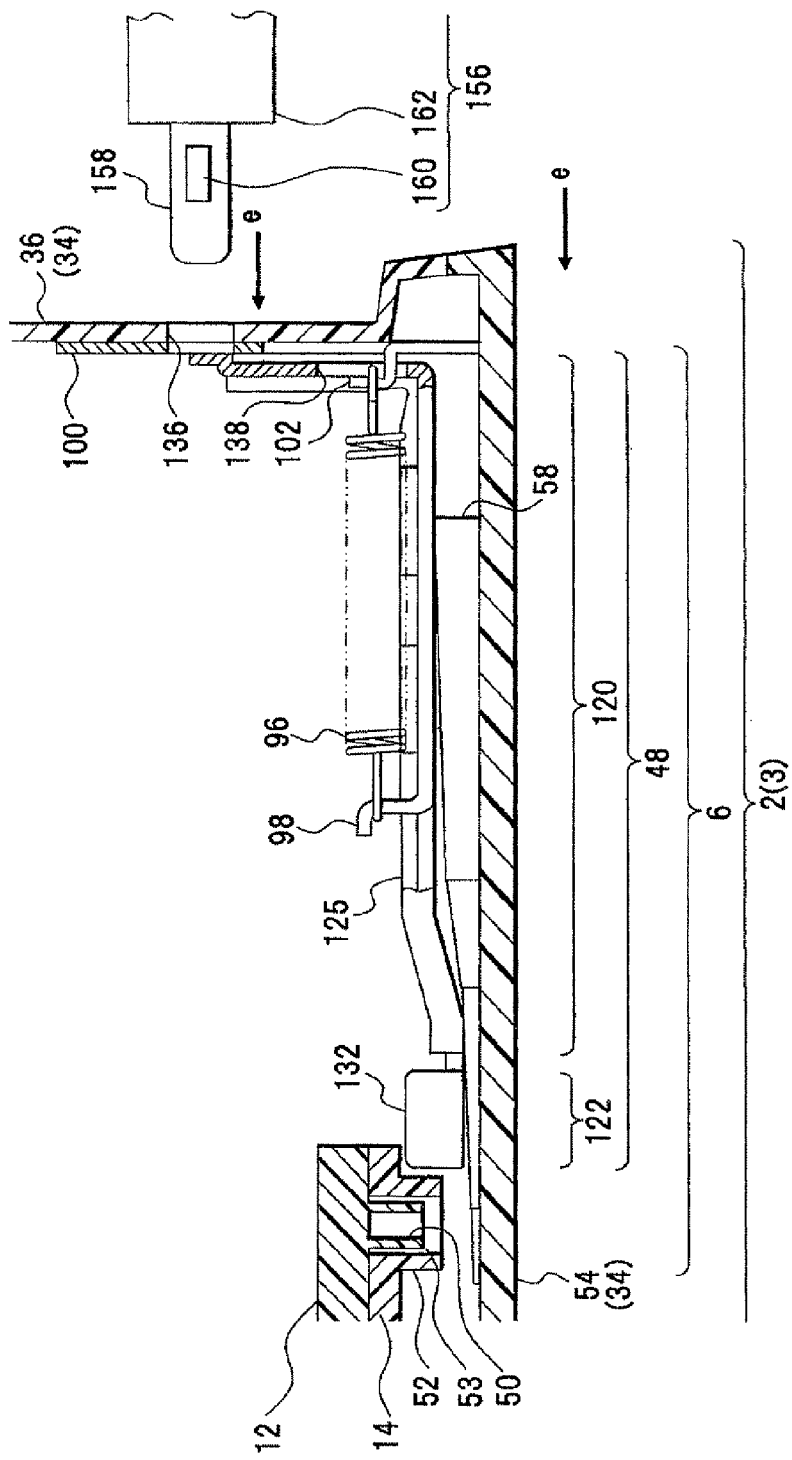
FIG. 16 is a view illustrating the lock arm part in a pre-locked state.
Figure 17:
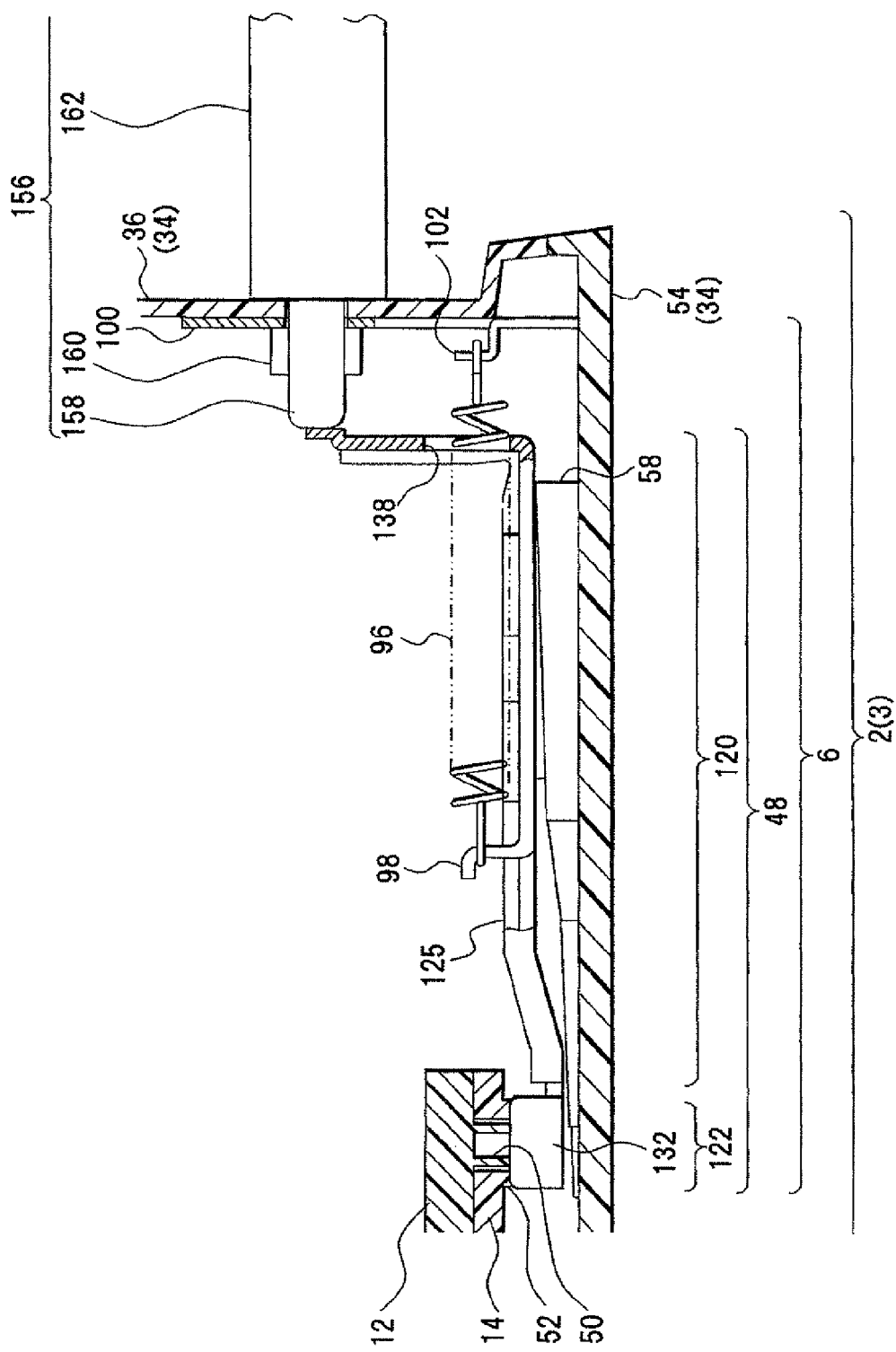
FIG. 17 is a view illustrating the lock arm part in a locked state.

Next, an example of a locking operation is described with reference to FIGS. 16 and 17. FIG. 16 is a view illustrating a pre-locked state, and FIG. 17 is a view illustrating a locked state.

For locking by the locking unit 2, a security plug 156 may be utilized as a locking member. The security plug 156 may move a lock flange 160 in a vertical direction from a horizontal direction by rotating a lock shaft 158 with a not-illustrated key. This movement may be performed with the key alone.

When the lock part 50 of the slide part 12 and the lock part 52 of the slide part 14 are situated in the locking position, a lock shaft 158 of the security plug 156 is inserted from the lock window in the arrow e direction.

When lock shaft 158 is inserted, the lock arm part 48 is moved against restoring force of the spring 96. When the lock shaft 158 of the security plug 156 is rotated, the upper case part 36 and the rear panel part 100 are sandwiched between the lock flange 160 of the lock shaft 158 and a base part 162 of the lock shaft 158 as illustrated in FIG. 17. If the not illustrated key is removed from the security plug 156, the locked state is maintained. As a result, since the lever part 16 stops rotating, the device 5 may be prevented from being detached from the device 3 side.

Figure 18:
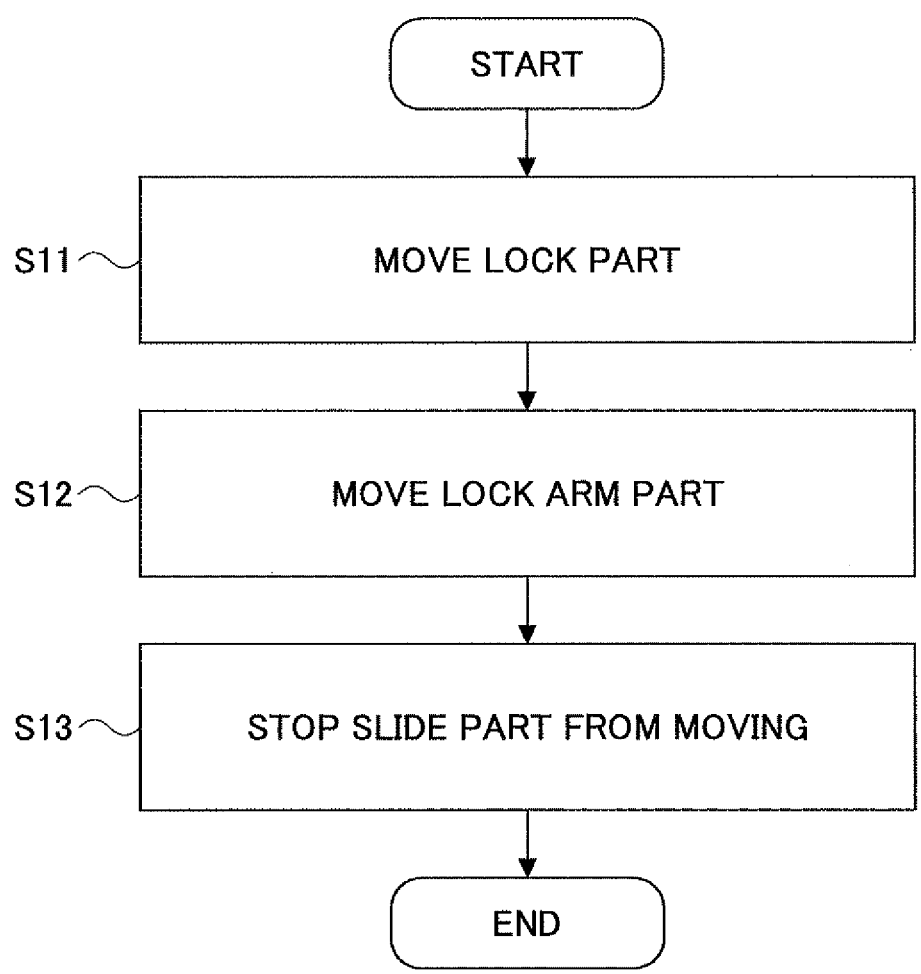
FIG. 18 is a flowchart illustrating an example of a locking method.

Next, the locking operation is described with reference to FIG. 18. FIG. 18 is a flowchart illustrating an example of the locking operation.

A process of this locking operation represents an example of the locking method disclosed in this embodiment. The locking method includes moving the lock parts 50 and 52 (step S11), moving the lock arm part 48 (step S12) and stopping the movement (step S13).

In the locking operation process, the lock part 50 of the slide part 12 and the lock part 52 of the slide part 14 are moved to the locking position (step S11). Subsequently, the lock arm part 48 is moved in a direction intersecting with the slide parts 12 and 14 (step S12).

Then, the lock parts 50 and 52 are engaged with the lock arm part 48 at the locking position so that the lock arm part 48 stops the slide parts 12 and 14 from moving (step S13).

With such a configuration, the coupling of the device 3 provided with the locking unit 2 and another device 5 is locked to stabilize the coupling of the devices 3 and 5, which may provide an advantageous effect on preventing the devices 3 and 5 from being stolen.

Second Embodiment

A second embodiment is a port replicator including the aforementioned locking unit (the first embodiment).

Figure 20:
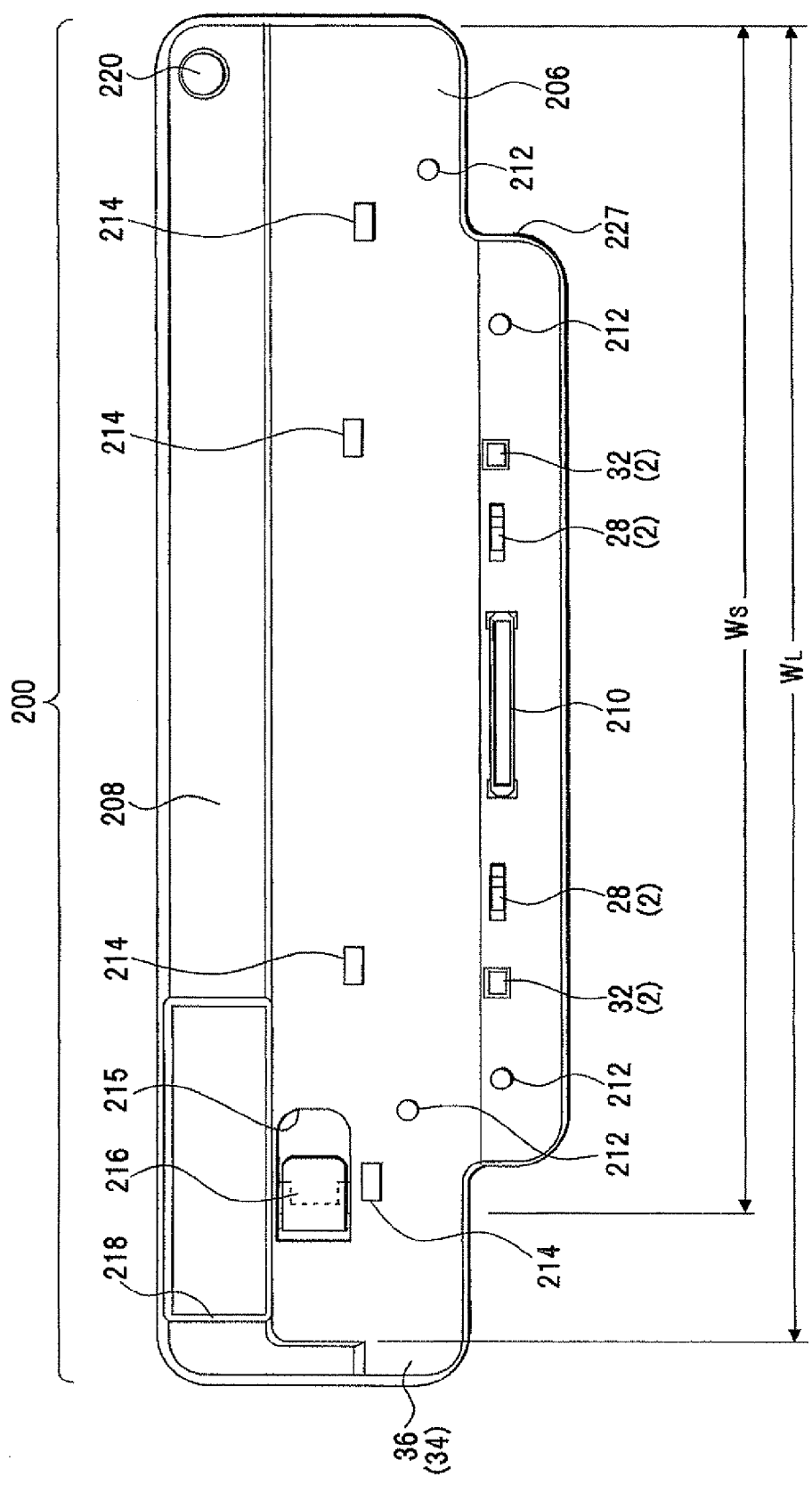
FIG. 20 is a view illustrating the port replicator viewed from its upper surface.
Figure 21:
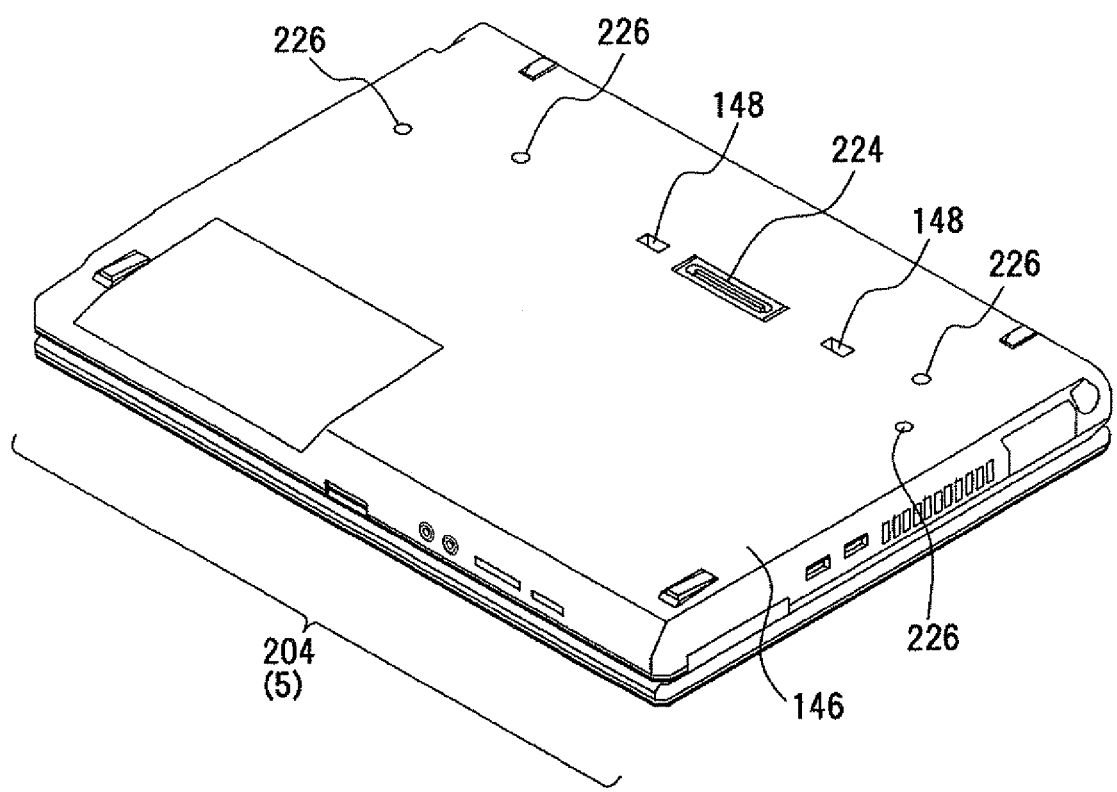
FIG. 21 is a view illustrating the mobile computer viewed from its rear surface.
Figure 22:
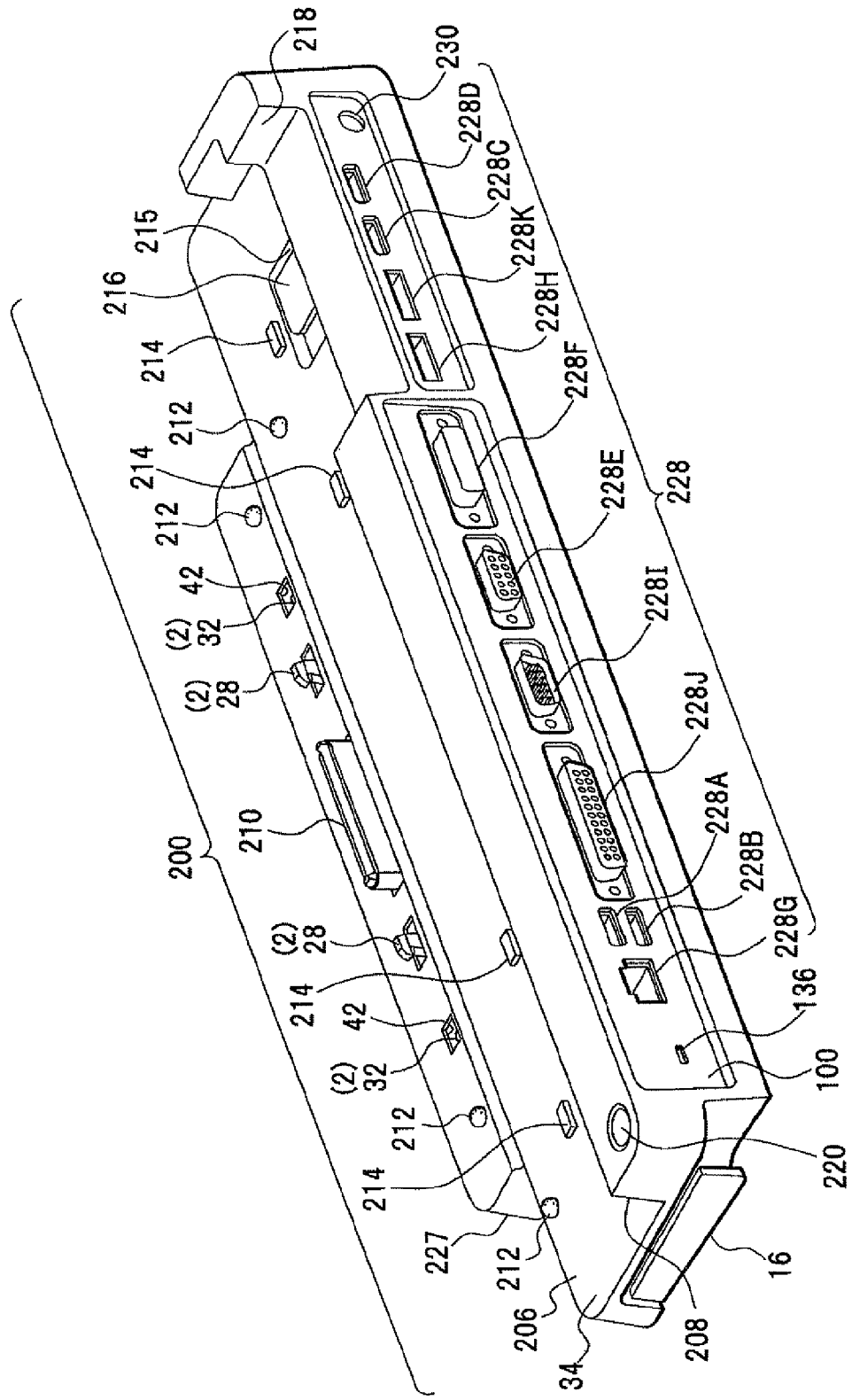
FIG. 22 is a perspective view illustrating the port replicator viewed from its rear surface.
Figure 23:
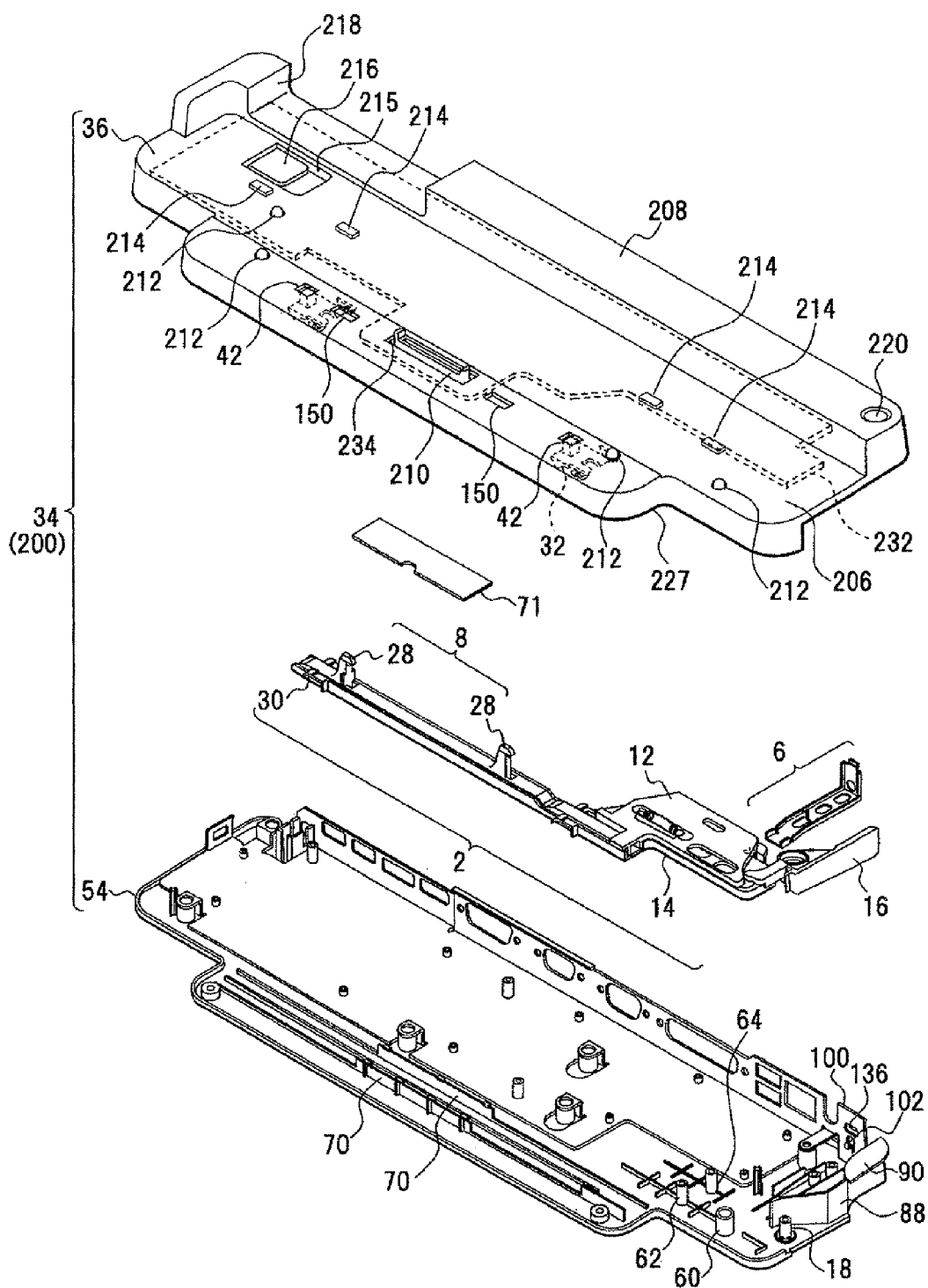
FIG. 23 is an exploded perspective view illustrating the port replicator.
Figure 24:
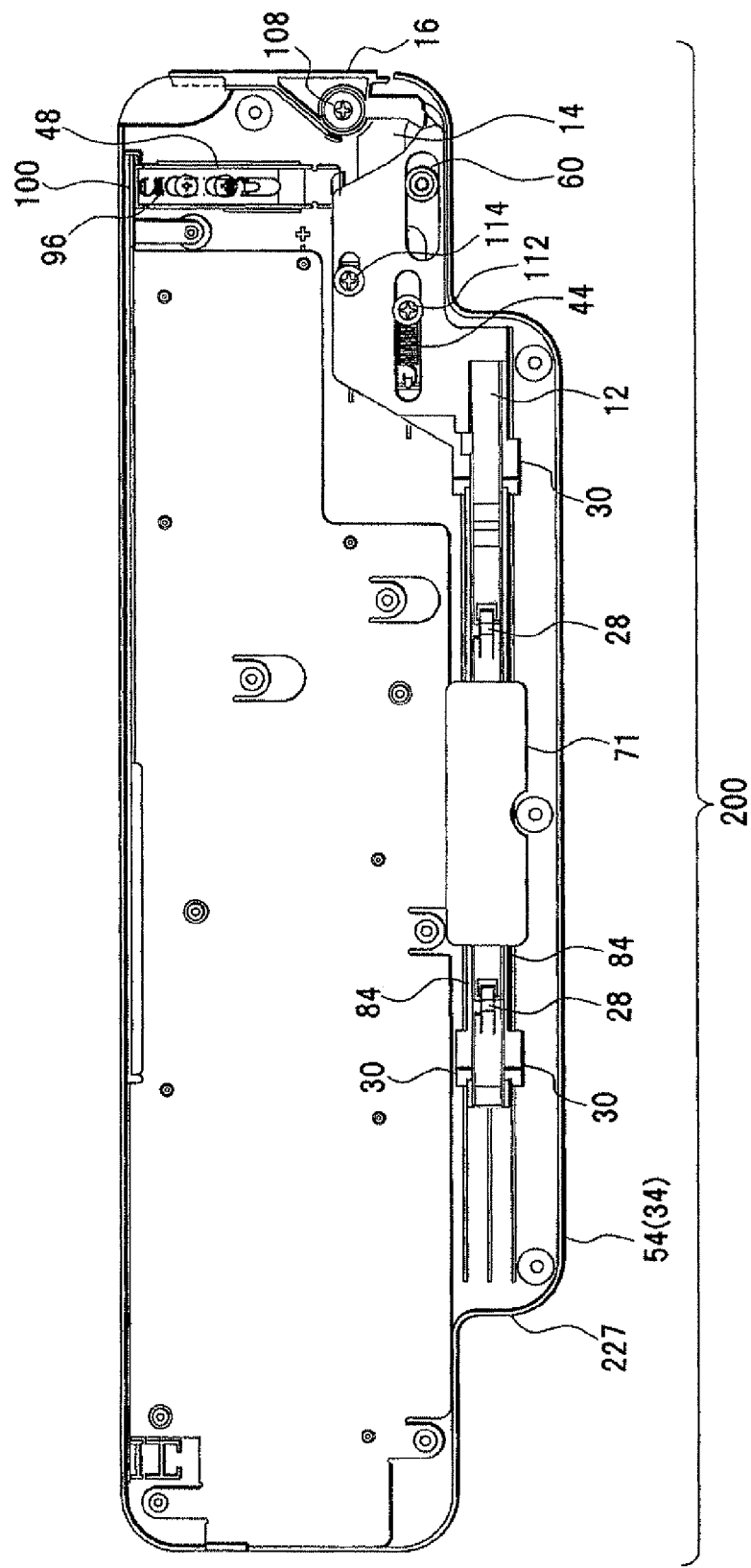
FIG. 24 is a view illustrating the port replicator from which an upper case part is removed.
Figure 25:
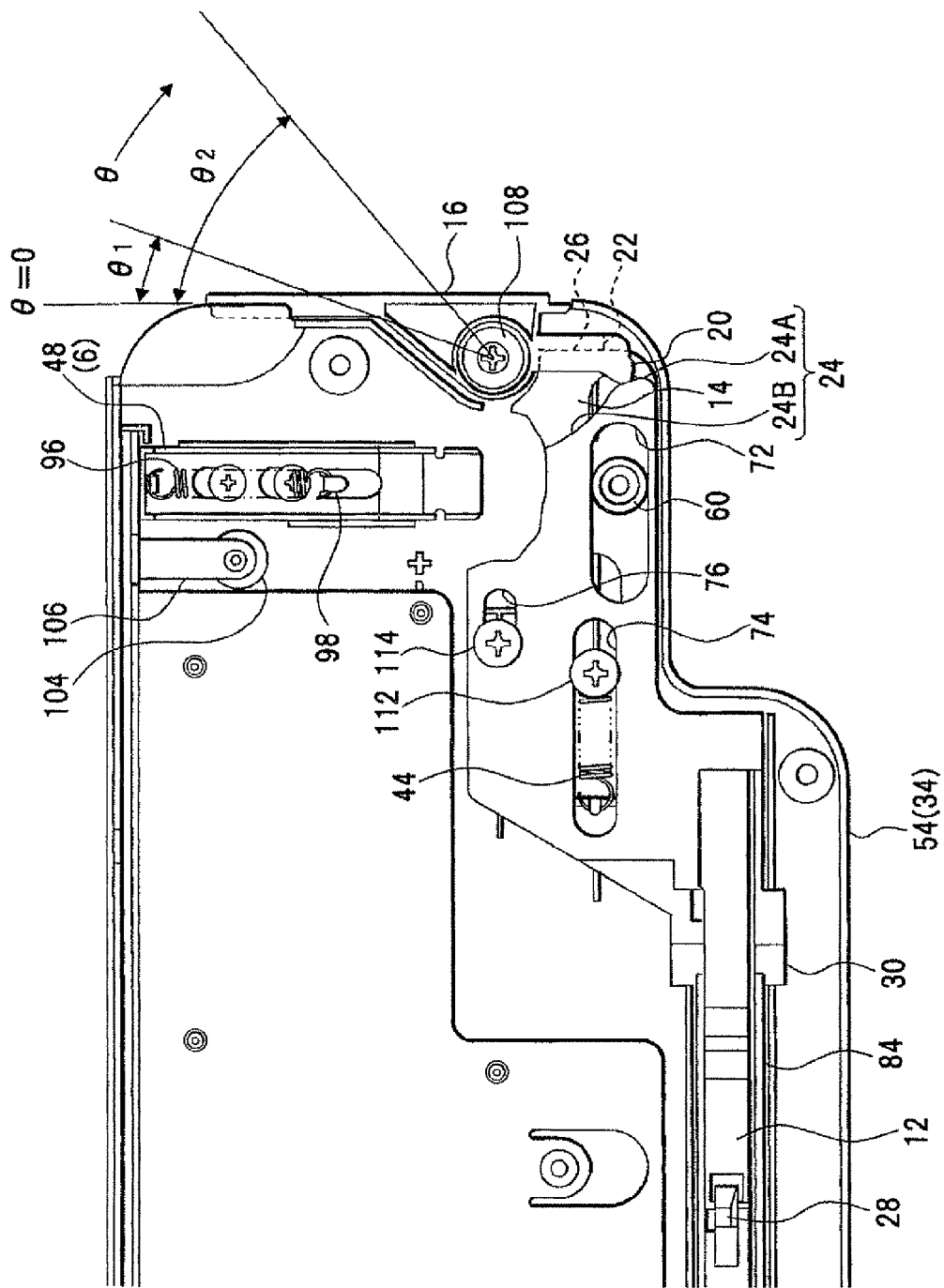
FIG. 25 is a view illustrating a locking mechanical part of the port replicator.

The second embodiment is described with reference to FIGS. 19, 20, 21, 22, 23, 24 and 25. FIG. 19 is a view illustrating a port replicator and a mobile computer (PC). FIG. 20 a plan view illustrating the port replicator. FIG. 21 is a view illustrating the PC viewed from its bottom surface. FIG. 22 is a perspective view illustrating the port replicator viewed from its rear surface. FIG. 23 is an exploded perspective view illustrating the port replicator. FIG. 24 is a view illustrating the port replicator from which an upper case part is removed. FIG. 25 is a view illustrating a locking mechanical part and a lever part. In FIGS. 19 to 25, components similar to those illustrated in FIGS. 1 and 2 are provided with the same reference numerals.

A port replicator 200 is an example of the locking device, the electronic device or the locking method disclosed in the first embodiment. The port replicator 200 includes a main body part 34. The main body part 34 incorporates the aforementioned locking unit 2 (see FIGS. 1 and 2) and includes a mounting surface 206 on its upper surface for mounting the PC 204. A support wall 208 is formed on a part from a side edge of the mounting surface 206 to a rear edge of the mounting surface 206. The PC 204 is located by the support wall 208 at a predetermined position.

The mounting surface 206 includes a connector 210, hook parts 28, lifting parts 32, ground parts 212, buffer parts 214 and an adjuster part 216. The support wall 208 includes a recess part 218 from which a connector of the PC 204 on the mounting surface 206 is exposed.

The connector 210 is configured to be connected to a connector 224 (FIG. 21) formed in the lower case part 146 of the PC 204 (FIG. 21). The hook parts 28 are configured to engage with the PC 204 to fix the PC 204. As already described above, the lifting parts 32 are configured to detach the PC 204 from the port replicator 200. The ground parts 212 are configured to be brought into contact with ground terminals 226 of the PC 204 to potentially equalize the PC 204. The buffer parts 214 are formed of an elastic material and configured to elastically receive the PC 204 on the mounting surface 206. The adjuster part 216 may be disposed such that the adjuster part 216 stands in a recess part 215 (see FIG. 22) formed in the upper surface of the upper case 36. The adjuster part 216 is utilized for locating a PC having a width WS smaller than a width WL of the PC 204. The main body part 34 includes a front surface projection part 227 and the front surface projection part 227 includes the hook parts 28, the lifting parts 32 and ground parts 212 on the left hand side and right hand side of the connector 210 in the middle.

As illustrated in FIG. 22, the rear panel part 100 of the port replicator 200 includes the lock window 136, an external connector group 228 and a power supply connector 230. In this case, the external connector group 228 includes a USB connector 228A, 228B, 228C and 228D, an external display connector 228E, a digital external display connector 228F, a LAN connector 228G, a high-definition multimedia interface (HDMI) terminal 228H, a serial port 228I, a parallel port 228J and an external serial advanced technology attachment (eSATA) 228K. An example of the digital external display connector 228F may be a digital only digital visual interface (DVI) terminal (DVI-D). The external connector group 228 is not limited to the aforementioned connectors.

As illustrated in FIG. 23, the main body part 34 of the port replicator 200 includes the upper case part 36 and the lower case part 54. The upper case part 36 includes a circuit board indicated by a broken line and the circuit board 232 includes the aforementioned connector 210. The connector 210 is projected from a window 234 of the upper case part 36. Further, the ground parts 212 projected from the upper case part 36 are connected to earth conductors of the circuit board 232. The lower case part 24 includes the aforementioned locking unit 2. As illustrated in FIG. 24, the locking unit 2 is disposed on the front surface projection part 227 side of the lower case part 54. As illustrated in FIG. 25, the locking mechanical part 6 is disposed in a direction intersecting with a sliding direction of the slide parts 12 and 14 of the locking unit 2. For example, the locking mechanical part 6 is disposed in a direction orthogonal to the sliding direction of the slide parts 12 and 14 of the locking unit 2. The lever part 16 is disposed near the locking mechanical part 6 that is, disposed on a side of the main body part 34 in this embodiment.

In FIG. 25, θ indicates an angle of the lever part 16 rotated from the starting position. The angle θ=0 indicates an attaching position (a fixing position) of the PC 204. The angle $θ=θ_1$ indicates a detaching position of the hook parts 28 from the PC 204. Further, an angle $θ≥θ_2$ indicates a lifting position of the lifting mechanical parts 10A and 10B. Other components of the locking unit 2 are already described in the first embodiment and their detailed descriptions are omitted from the second embodiment.

Next, the attaching and detaching operations and the locking operation is described with reference to FIGS. 26, 27, 28, 29, 30, 31, 32, 33, 34, 35, 36, 37, 38, 39 and 40.

(1) Attaching Operation

Figure 26:
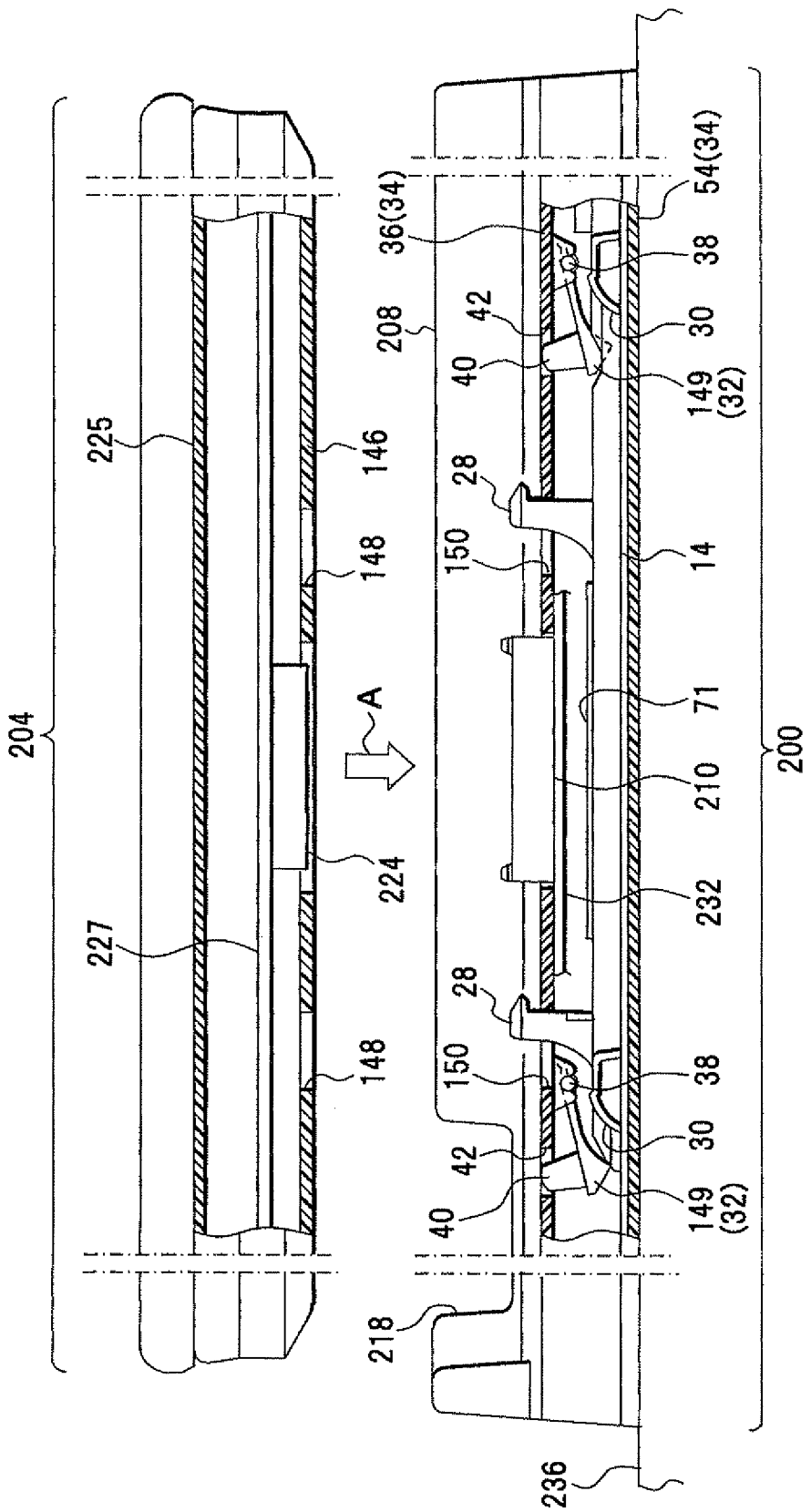
FIG. 26 is a view illustrating the mobile computer and the port replicator before they are coupled.

The attaching operation includes attaching the PC 204 to the port replicator 200. As illustrated in FIG. 26, the port replicator 200 is placed on a horizontal surface 236 of the PC 204 so that the port replicator 200 is horizontally maintained. The PC 204 is adjusted to a mounting position of the port replicator 200 from an upper part of the port replicator 200 by moving the PC 204 in the arrow A direction.

Figure 27:
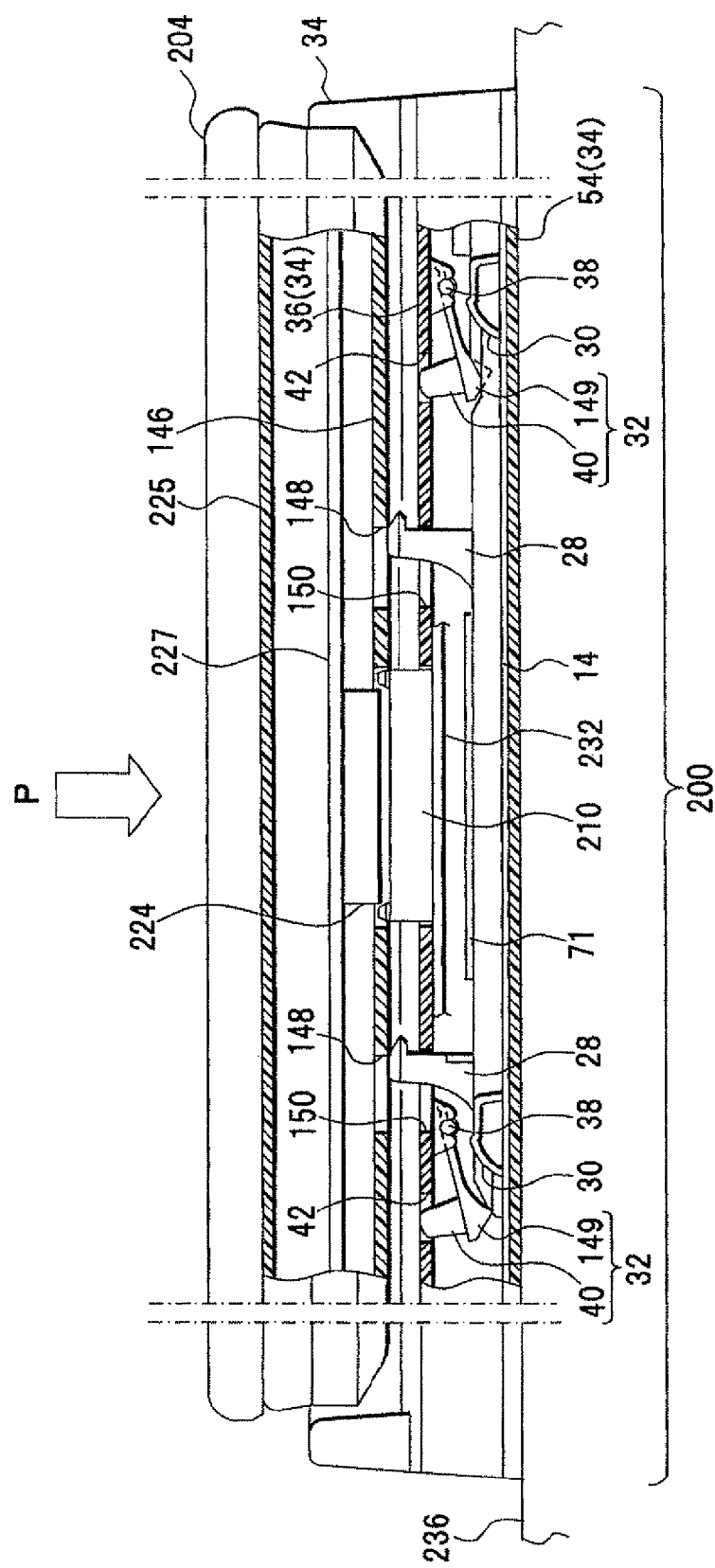
FIG. 27 is a view illustrating the mobile computer and the port replicator immediately before they are coupled.

As illustrated in FIG. 27, the PC 204 is disposed on the port replicator 200, and the connector 210 of the port replicator 200 is allowed to match the connector 224 of the PC 204. If pressure P is applied in a direction orthogonal to the horizontal surface 236 of the PC 204; that is, if the pressure P is applied in a vertical direction of the horizontal surface 236 of the PC 204, the connector 210 is coupled with the connector 224. In this case, the connector 224 is disposed on the circuit board 227 disposed between the lower case part 146 and the lower case part 225 of the PC 204.

Figure 28:
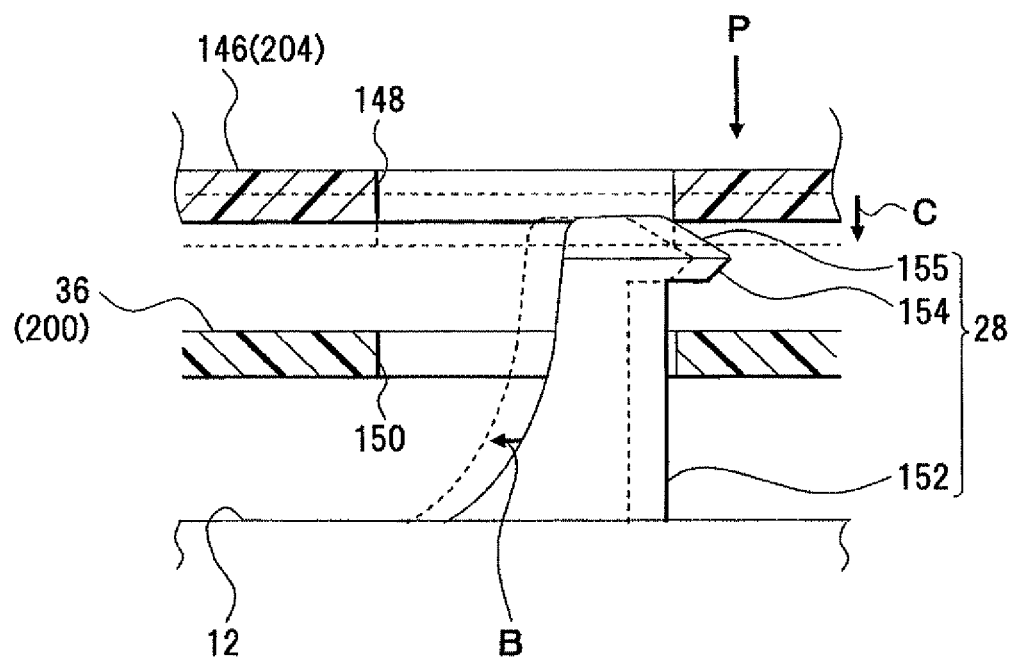
FIG. 28 is a view illustrating movement of a hook part.
Figure 29:
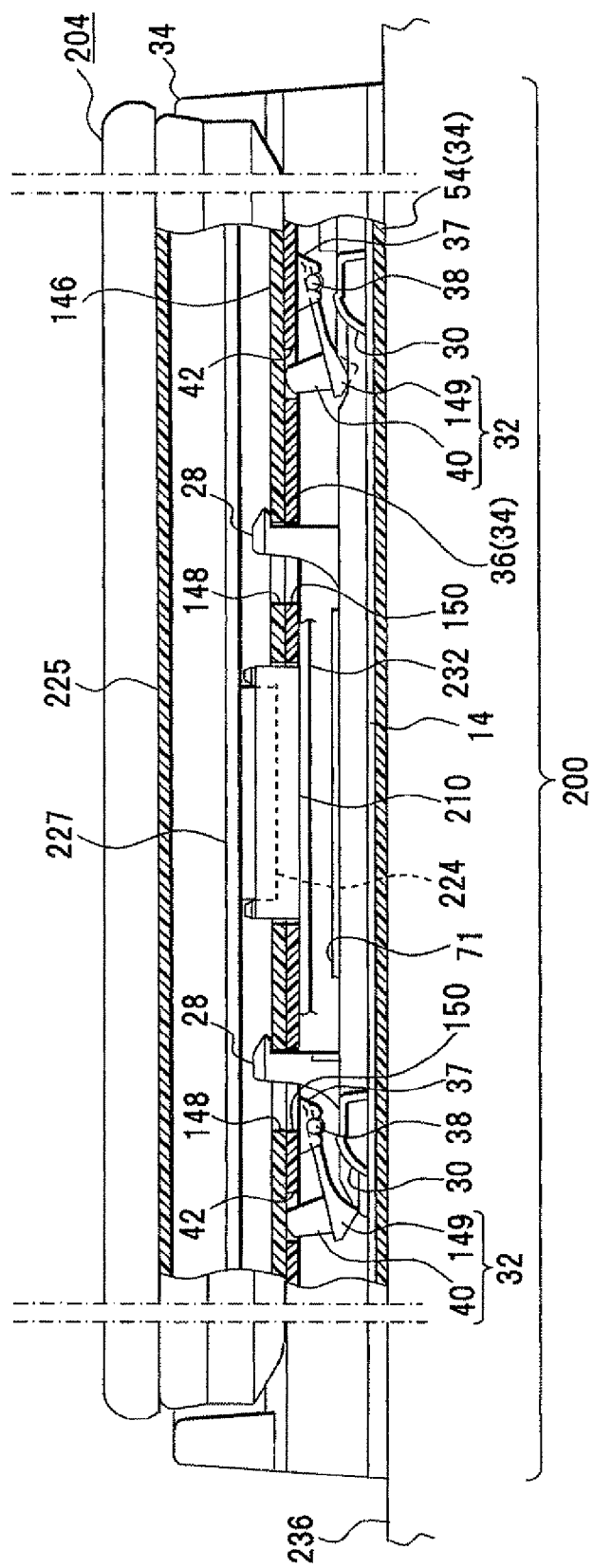
FIG. 29 is a view illustrating a state in which an angle of the lever part is θ=0.

In this case, the hook parts 28 may be moved by the pressure P. As illustrated in FIG. 28, the upper surface of the beak part 154 of the hook part 28 includes the slope part 155, and the edge of the fixation hole 148 of the lower case part 146 of the PC 204 comes in contact with the slope part 155. The pressure P is applied from the edge of the fixation hole 148 of the lower case part 146 to the slope part 155. As a result, the spring 44 is extended against the restoring force of the spring 44 to move the hook part 28 together with the slide part 12 in the arrow B direction. With this movement, the PC 204 is lowered and the lower case part 146 of the PC 204 eventually reaches the upper case part 36 of the port replicator 200. At this moment, each of the hook parts is moved in the arrow B direction so that the hook part 28 penetrates the fixation hole 148 of the PC 204 to reach above the lower case part 146. Thereafter, the hook part 28 is moved together with the slide part 12 back to the fixing position by the restoring force of the spring 44. As illustrated in FIG. 29, the PC 204 is fixed to the mounting surface 206 of the port replicator 200.

In the second embodiment, the PC 204 is configured to be automatically attached to the port replicator 200 by the application of the pressure P to PC 203; however, the second embodiment is not limited to such a configuration. That is, the PC 204 may be attached to the port replicator 200 by rotating the lever part 16 to the position of the angle $\theta=\theta_1$. Accordingly, the hook part 28 is moved to the attaching position together with the slide part 12, and similarly, the PC 204 is fixed to the port replicator 200 by moving the lever part 16 back to the position of the angle $\theta=0$.

(2) Detaching Operation

Figure 30:
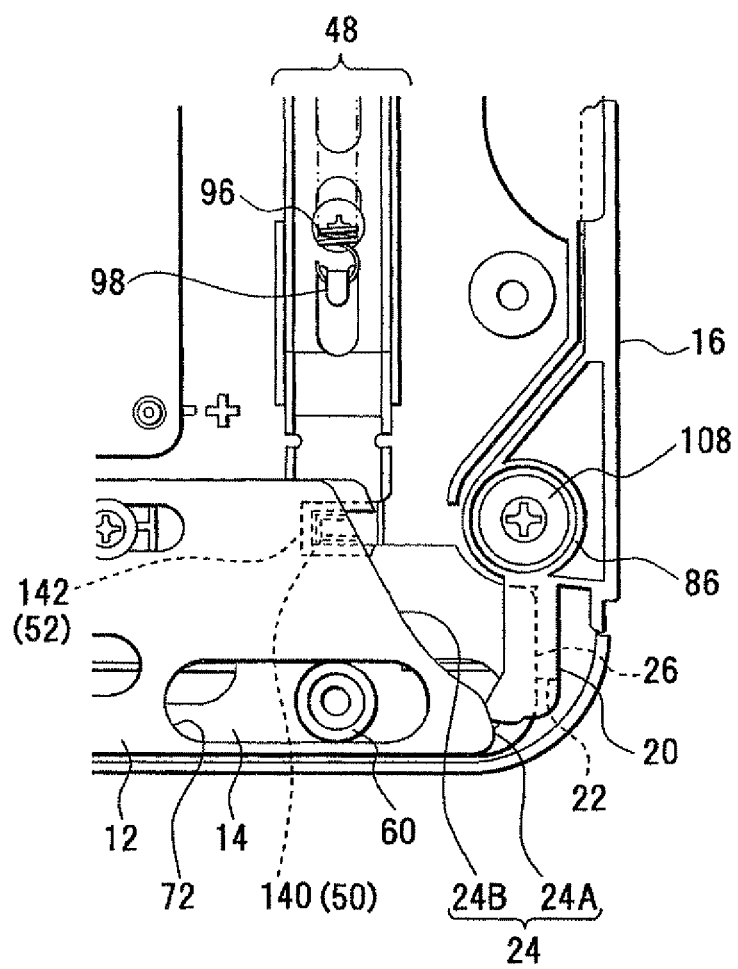
FIG. 30 is a view illustrating a state in which the angle of the lever part is θ=0.
Figure 31:
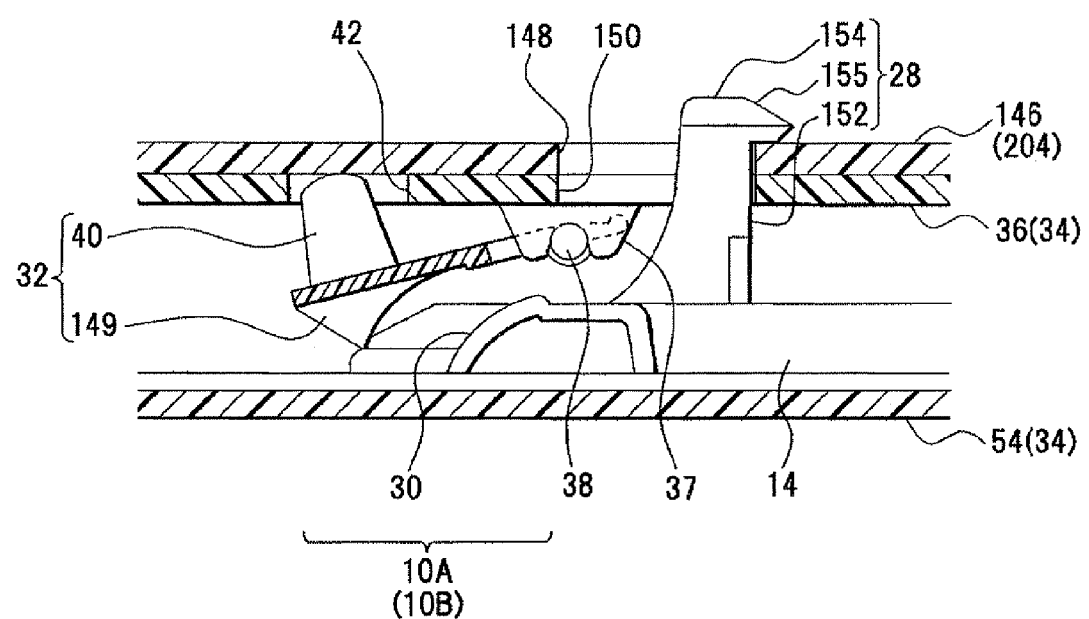
FIG. 31 is a view illustrating a state in which the angle of the lever part is θ=0.

The detaching operation includes detaching the PC 204 in an attached state (fixed state) from the port replicator 200. As illustrated in FIG. 30, if the PC 204 is attached to the port replicator 200, the angle $\theta$ of the lever part 16 is located at a fixing position $\theta=0$ (a reference position). At this moment, the slide parts 12 and 14 are both located at the reference position, and each of the hook parts 28 is inserted into a corresponding one of the fixation holes 148 of the PC 204. Accordingly, the hook parts 28 are fixed on an upper side of a lower case 146. That is, since the beak part 154 is located above the lower case 146, the PC 204 may be prevented from being detached from the port replicator 200. Further, the lifting mechanical parts 10A and 10B are located at a lower side of the upper case part 36 of the port replicator 200.

Figure 32:
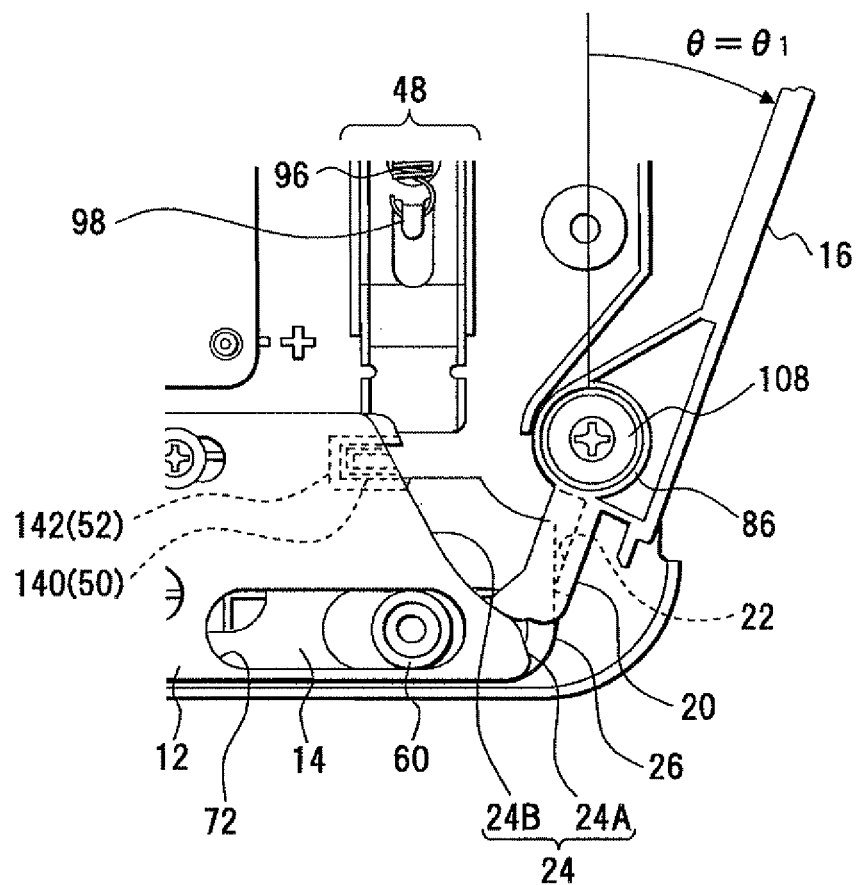
FIG. 32 is a view illustrating a state in which the angle of the lever part is θ=θ$_1$.
Figure 33:
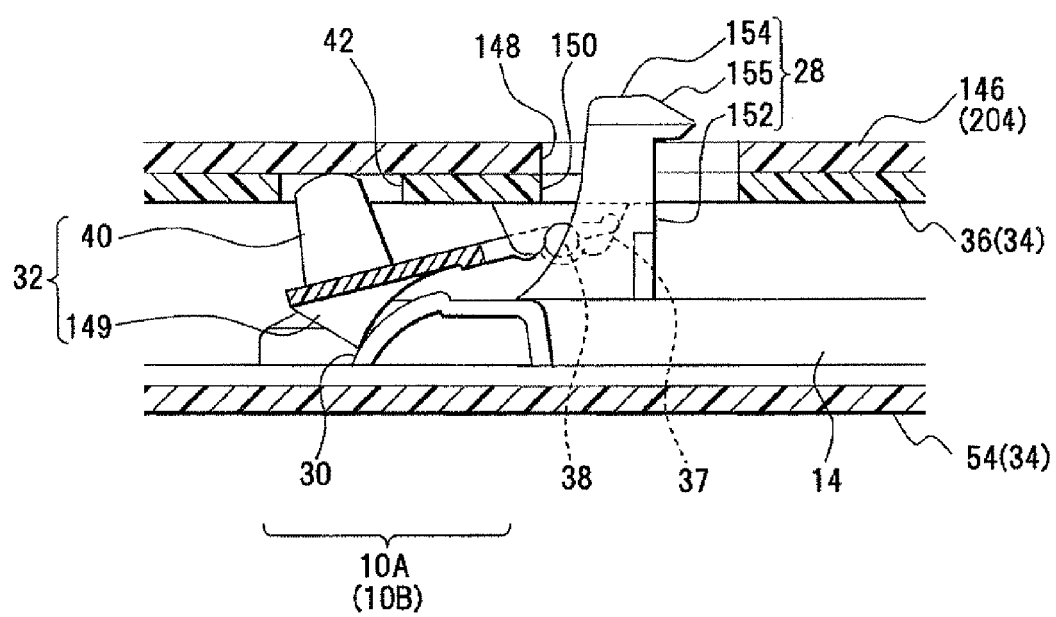
FIG. 33 is a view illustrating a state in which the angle of the lever part is θ=θ$_1$.
Figure 34:
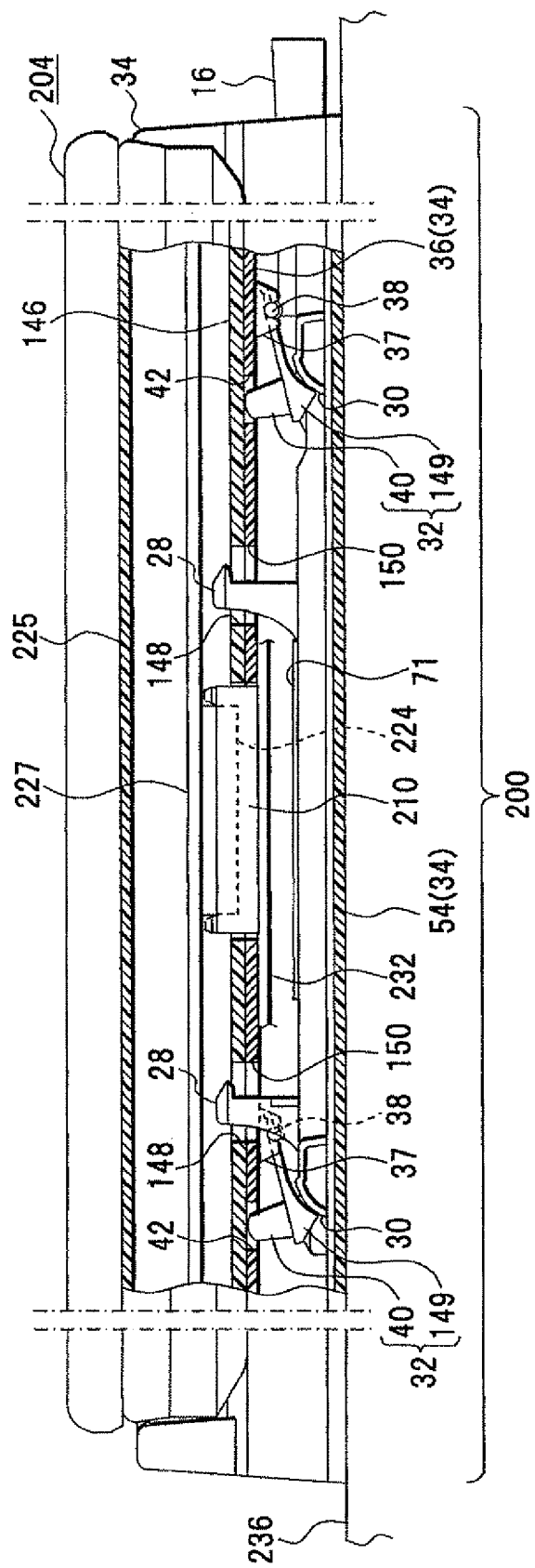
FIG. 34 is a view illustrating a state in which the angle of the lever part is θ=θ$_1$.

As illustrated in FIG. 32, if the lever part 16 is moved to the position of the angle $\theta=\theta_1$ from this attached state, the slide part 12 is moved as described above, and the hook part 28 is moved together with the movement of the slide part 12 as illustrated in FIG. 33. In this case, the hook part 28 is moved to a central part of the fixation hole 148 of the PC 204 so that the beak part 154 is detached from the lower case part 146 of the PC 204. In this case, the PC 204 is in a state in which the PC 204 is disposed on the mounting surface 206 of the port replicator 200. However, since the coupling of the PC 204 and the port replicator 200 is released, the PC 204 is detached from the port replicator 200.

(3) Lifting Operation

Figure 35:
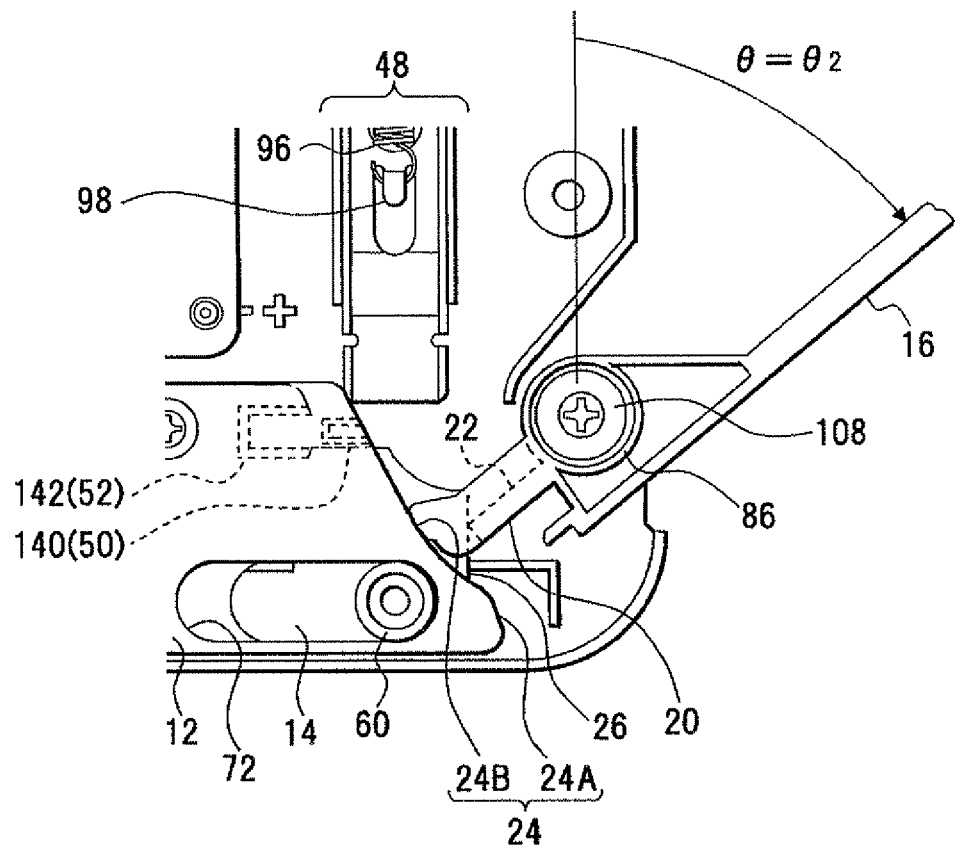
FIG. 35 is a view illustrating a state in which the angle of the lever part is θ≤θ$_2$.
Figure 36:
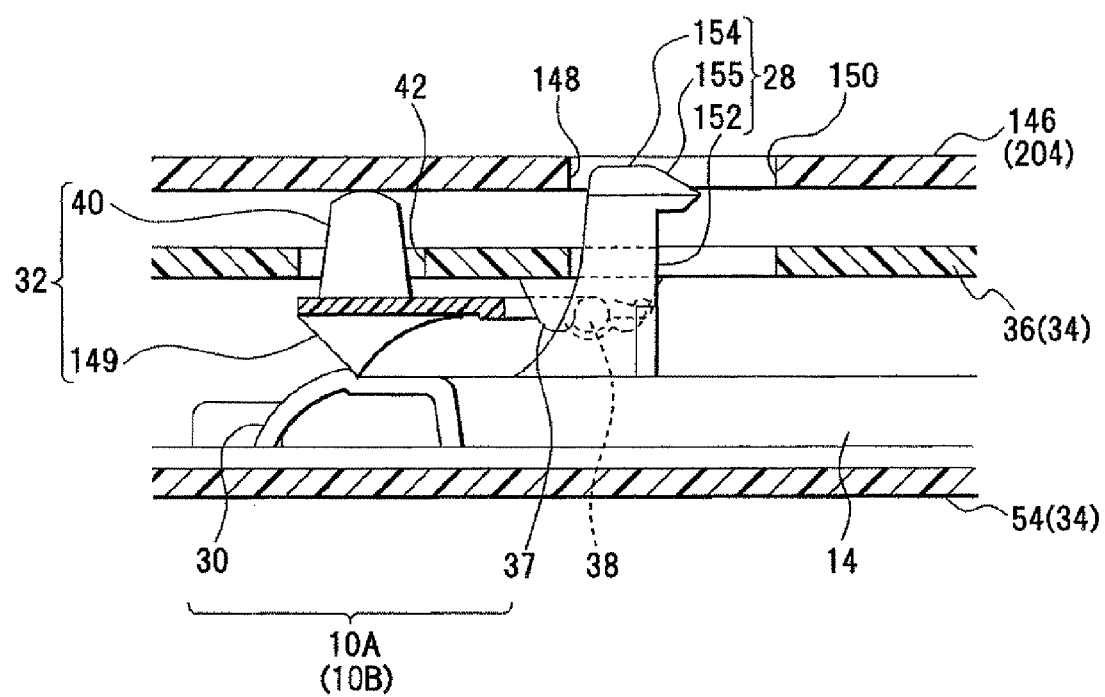
FIG. 36 is a view illustrating a state in which the angle of the lever part is θ≤θ$_2$.
Figure 37:
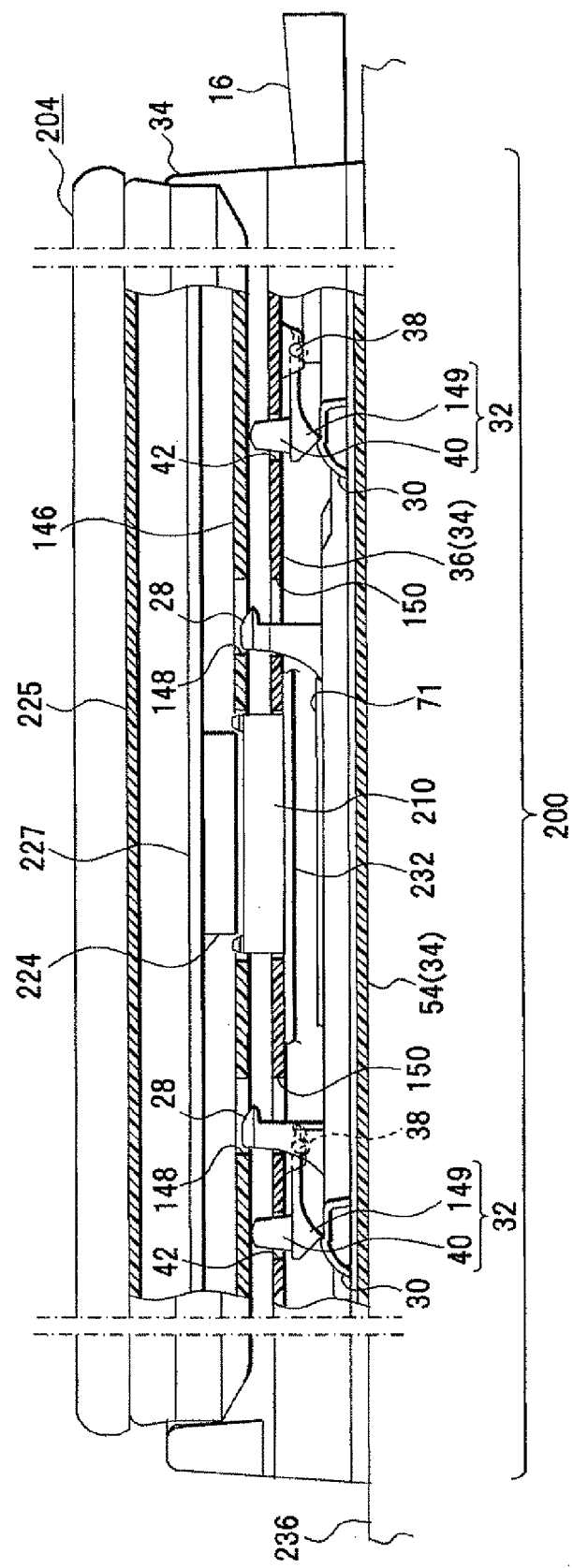
FIG. 37 is a view illustrating a state in which the angle of the lever part is θ≤θ$_2$.

The lifting operation includes lifting the PC 204 that has been detached from the port replicator 200. As illustrated in FIG. 35, the lever part 16 is rotated from the position of the angle $\theta=\theta_1$ to the position of the angle $\theta\leq\theta_2$. At this moment, as illustrated in FIG. 36, the location of the hook parts 28 move together with the slide part 12 such that the lifting projections 40 of the lifting mechanical parts 10A and 10B are projected from the windows 42 above the mounting surface of the port replicator 200. As illustrated in FIG. 37, the lower case part 146 of the PC 204 is lifted up by the lifting projections 40 being projected from the windows 42. A user may pick up the PC 204 easily from the port replicator 200.

(4) Locking Operation

Figure 38:
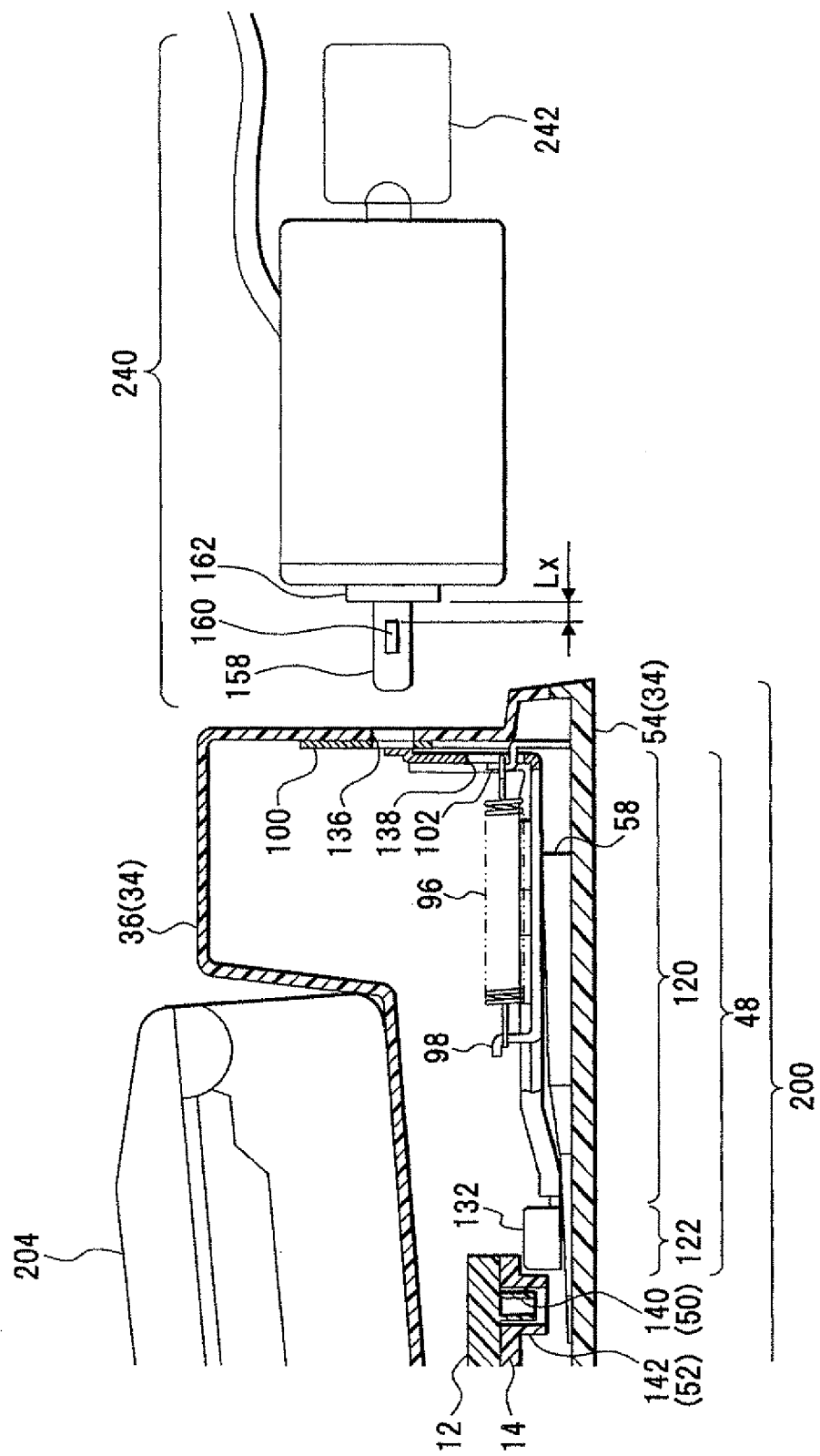
FIG. 38 is a view illustrating a pre-locked state.

The locking operation includes preventing the PC 204 attached to the port replicator 200 from being detached from the port replicator 200. As illustrated in FIG. 38, a locking device 240 such as the Kensington device may be utilized for the locking operation. The locking device 240 includes the aforementioned lock shaft 158, lock flange 160 and the like, and an interval Lx necessary for locking is set between the lock flange 160 and the base part 162. The locking device 240 is provided with a key 242. The lock shaft 158 is rotated with the key 242 to the locking position so that the lock shaft 158 may be maintained at the locking position by detaching the key 242.

Figure 39:
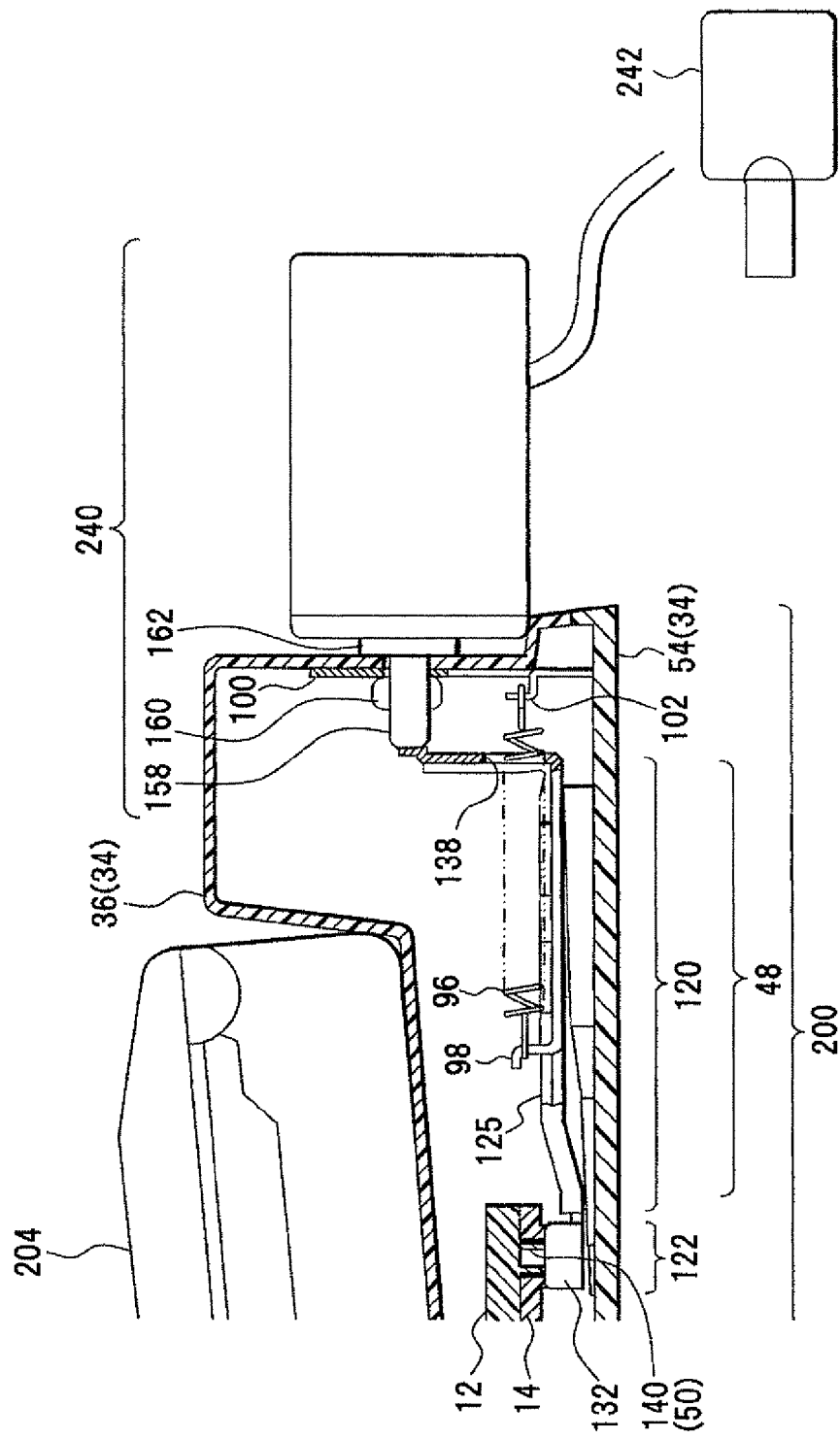
FIG. 39 is a view illustrating a locked state.
Figure 40:
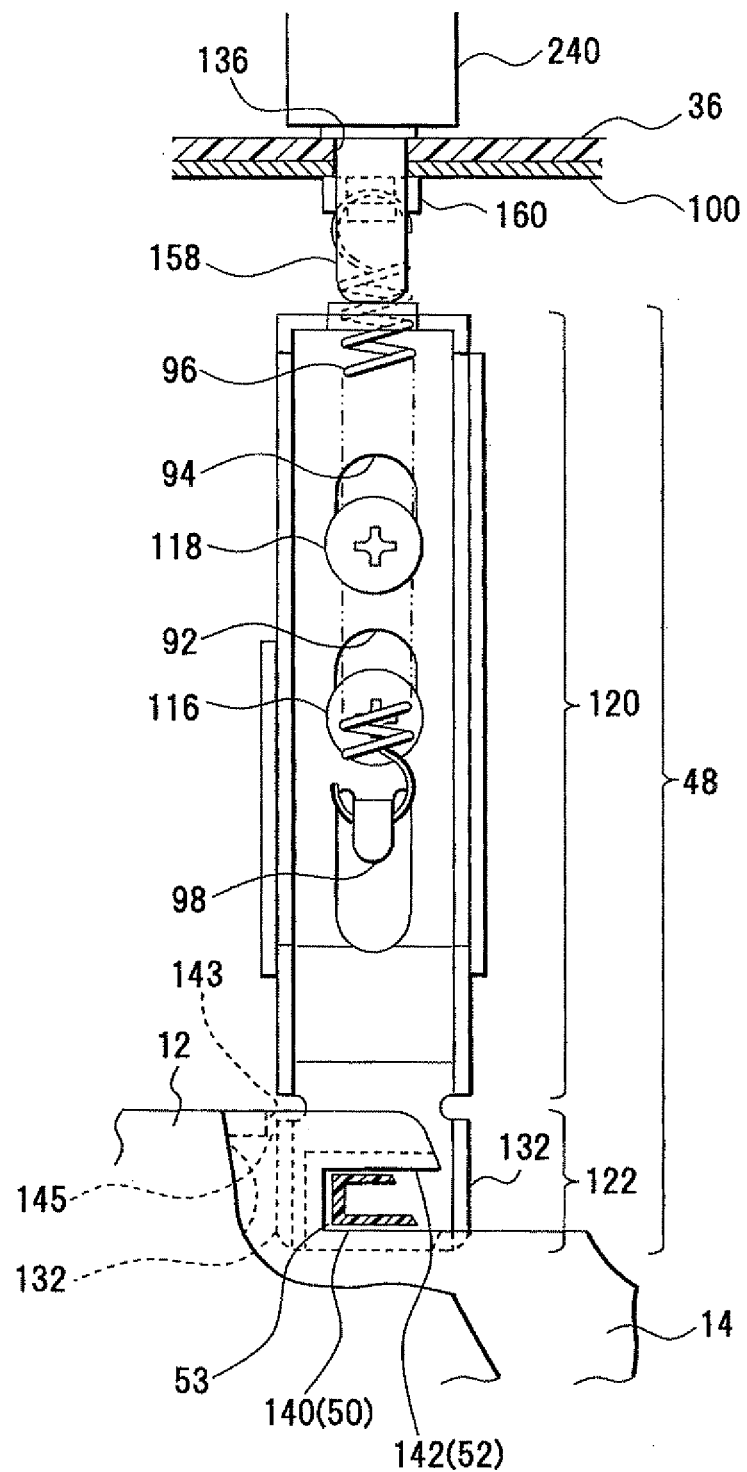
FIG. 40 is a view illustrating a lock part in a locked state by the locking mechanical part.

Thus, the lock shaft 158 of the locking device 240 is inserted from the lock window 136 of the port replicator 200. In this case, the lock shaft 158 is maintained in a projected state by allowing the upper case part 36 and the rear panel part 100 to be sandwiched between the lock flange 160 and the base part 162. Hence, the lock shaft 158 of the locking device 240 results in a locked state as illustrated in FIGS. 39 and 40.

When the lock shaft 158 is inserted, the lock arm part 48 moves by extending the spring 96. Accordingly, the restraining part 122 is moved to a position of the rib 140 of the lock part 50 of the slide part 12 and the 142 of the lock part 52 of the slide part 14. That is, the rib 140 and 142 of the lock parts 50 and 52 are simultaneously inserted between the stand walls 132 of the restraining part 122. Thus, the slide parts 12 and 14 may be prevented from moving.

Figure 41:
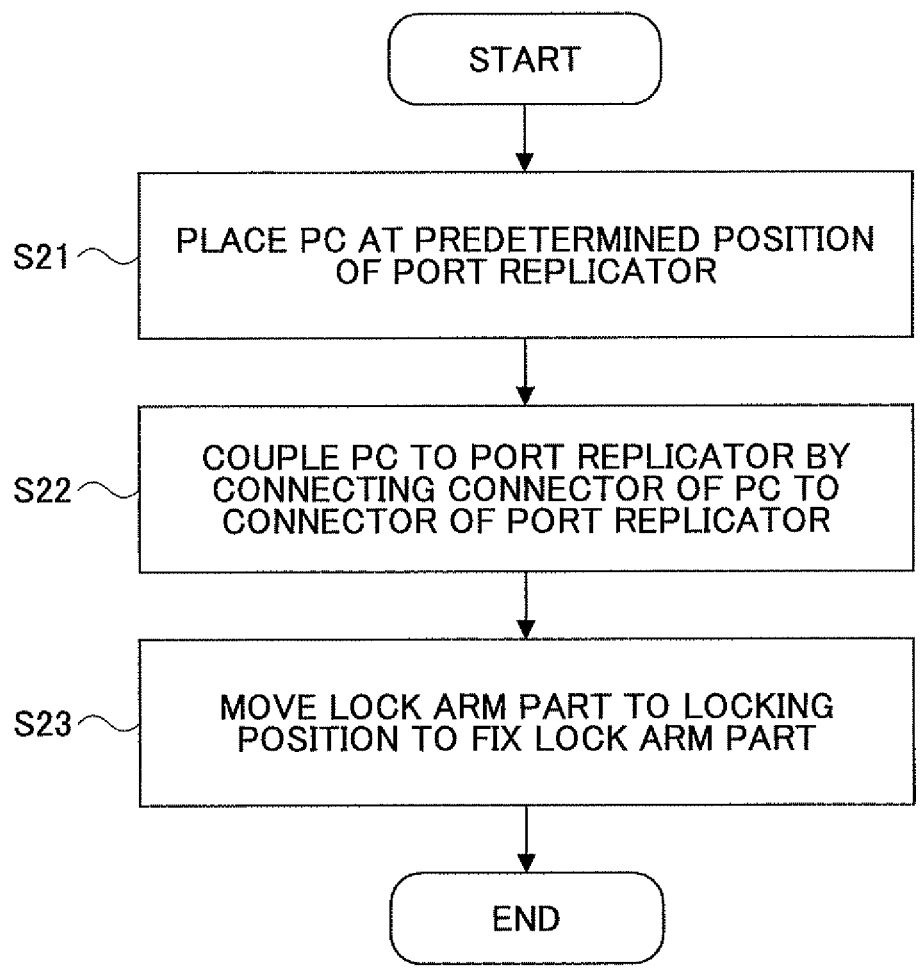
FIG. 41 is a flowchart illustrating examples of an attaching/detaching and locking method of the mobile computer.

Next, a procedure of attaching and detaching operations, a locking operation and an unlocking operation is described with reference to FIGS. 41 and 42.

The procedure is an example of the lock method disclosed in this embodiment. Thus, as illustrated in FIG. 41, the PC 204 is placed such that the PC is attached to and locked on the port replicator 200 at a predetermined position (step S21). The connector 224 of the PC 204 is connected to the connector 210 of the port replicator 200 such that the PC 204 is coupled with the port replicator 200 (step S22). The lock arm part 48 is moved to the locking position to fix the lock arm part 48 (step S23)

Figure 42:
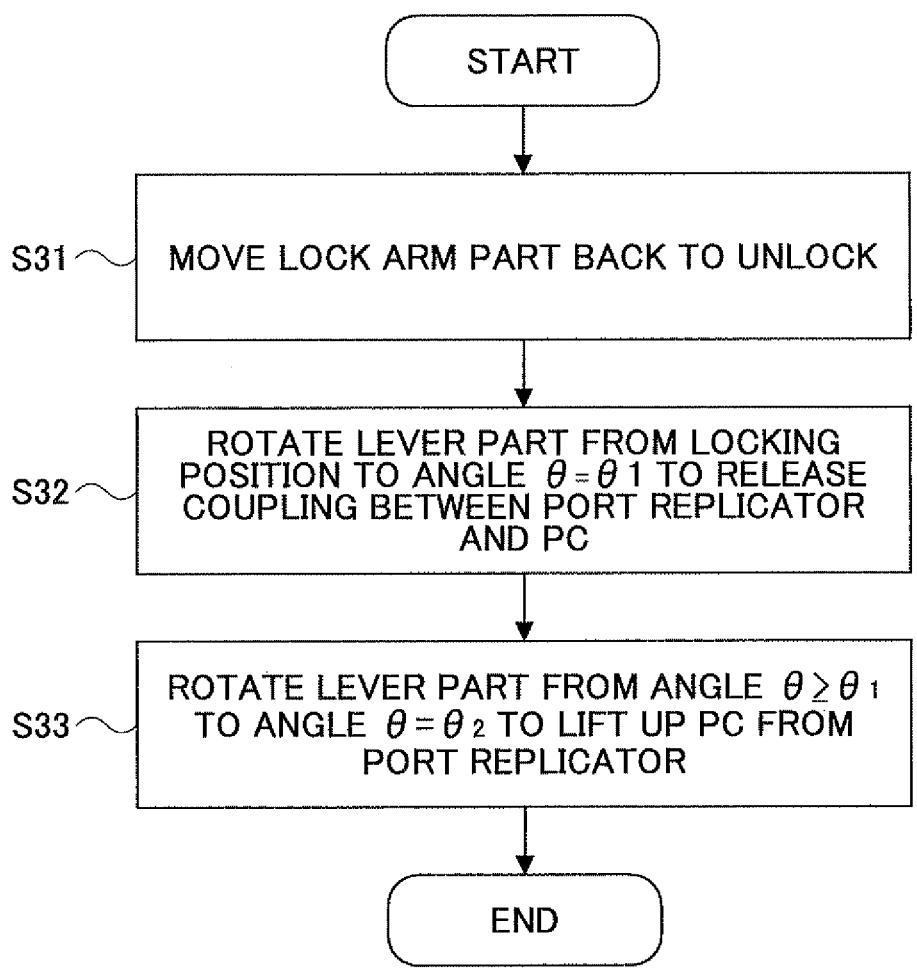
FIG. 42 is a flowchart illustrating an example of the attaching/detaching and locking method of the mobile computer.

Further, as illustrated in FIG. 42, the lock arm part 48 is moved to unlock the lock arm part 48 (step S31). The lever part 16 is rotated from the locking position to the position of the angle $\theta=\theta_2$ to release the coupling of the port replicator 200 and the PC 204 (step S32). The lever part 16 is then rotated from the position of the angle $\theta\geq\theta_2$ to the position of the angle $\theta=\theta_2$ to lift up the PC from the port replicator 200 (step S33).

Figure 43:
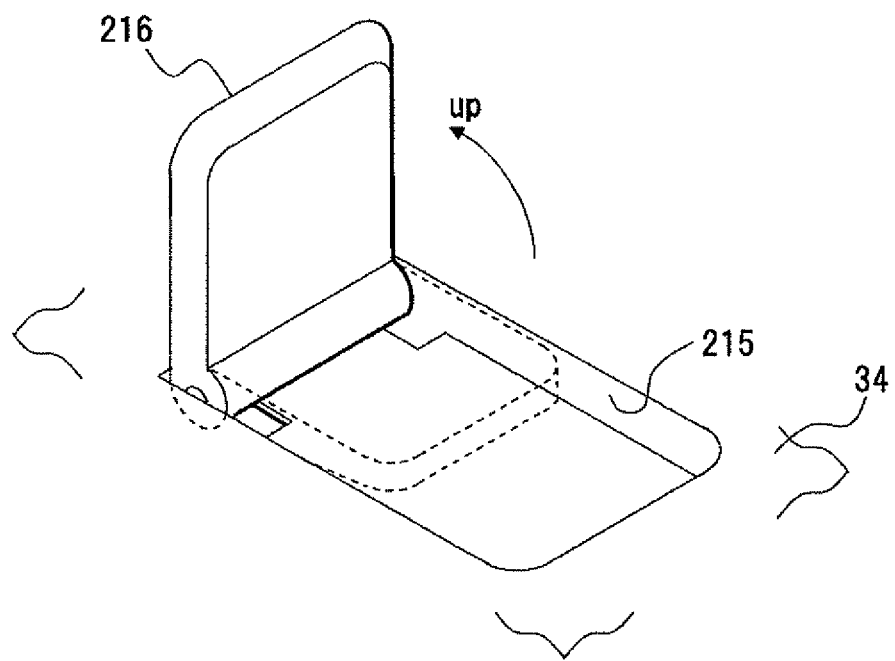
FIG. 43 is a view illustrating an operation of an adjuster part.
Figure 44:
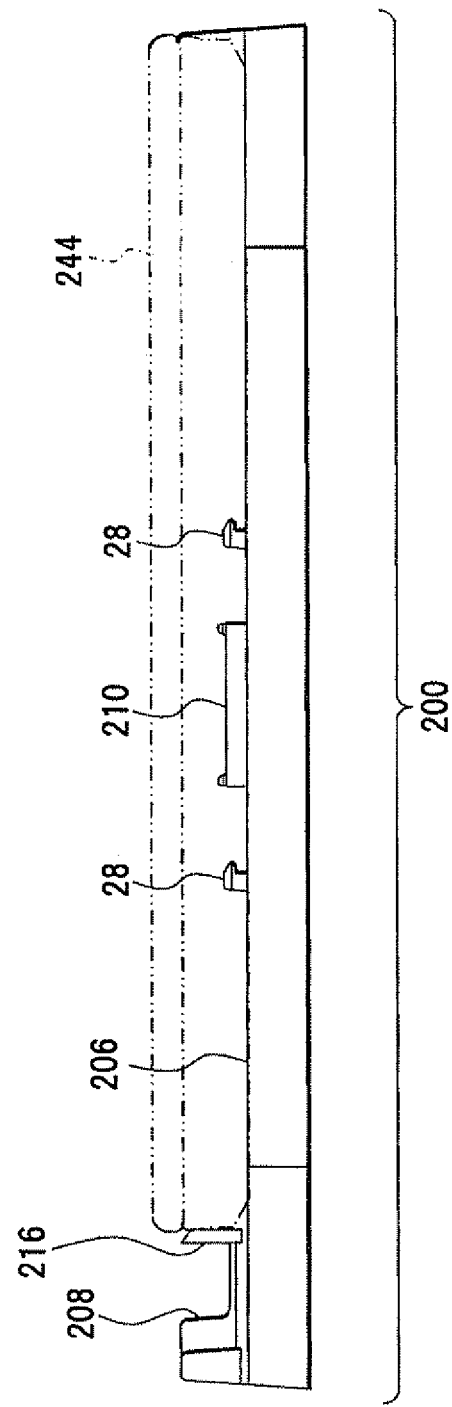
FIG. 44 is a view illustrating another mobile computer in a coupled state.

Next, an adjuster operation is described with reference to FIGS. 43 and 44. FIG. 43 is a view illustrating an operation state of an adjuster part. FIG. 44 is a view illustrating a mobile computer located by the adjuster part.

As illustrated in FIG. 43, the adjuster part 216 is raised up. Accordingly, a supporting position of the support wall 208 of the mounting surface 206 is moved to a position of the adjuster part 216.

Thus, as illustrated in FIG. 44, a PC 244 having a narrow width is located on the mounting surface 206 between the adjuster part 216 and a rear side support surface of the support wall 208. In this case, the PC 244 may include a fixation hole 148 and a connector 224 corresponding to the hook part 28 and the connector 210.

With such a configuration, the A-size PC 204 and the B-5 size PC 244 may be attached commonly to the port replicator 200. Thus, the port replicator having this configuration may be convenient for use.

Third Embodiment

Figure 45:
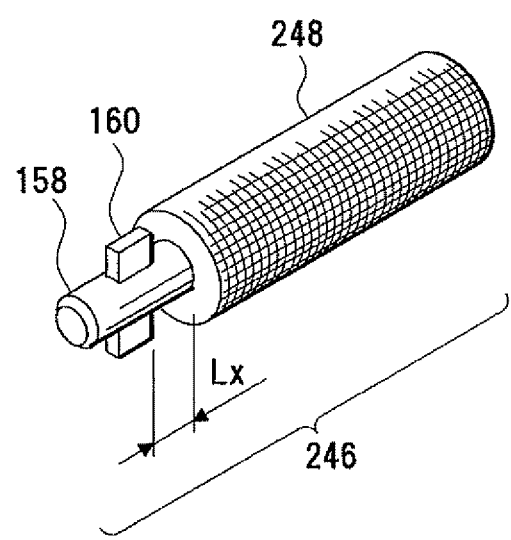
FIG. 45 is a view illustrating a locking fixture according to a third embodiment.
Figure 46:
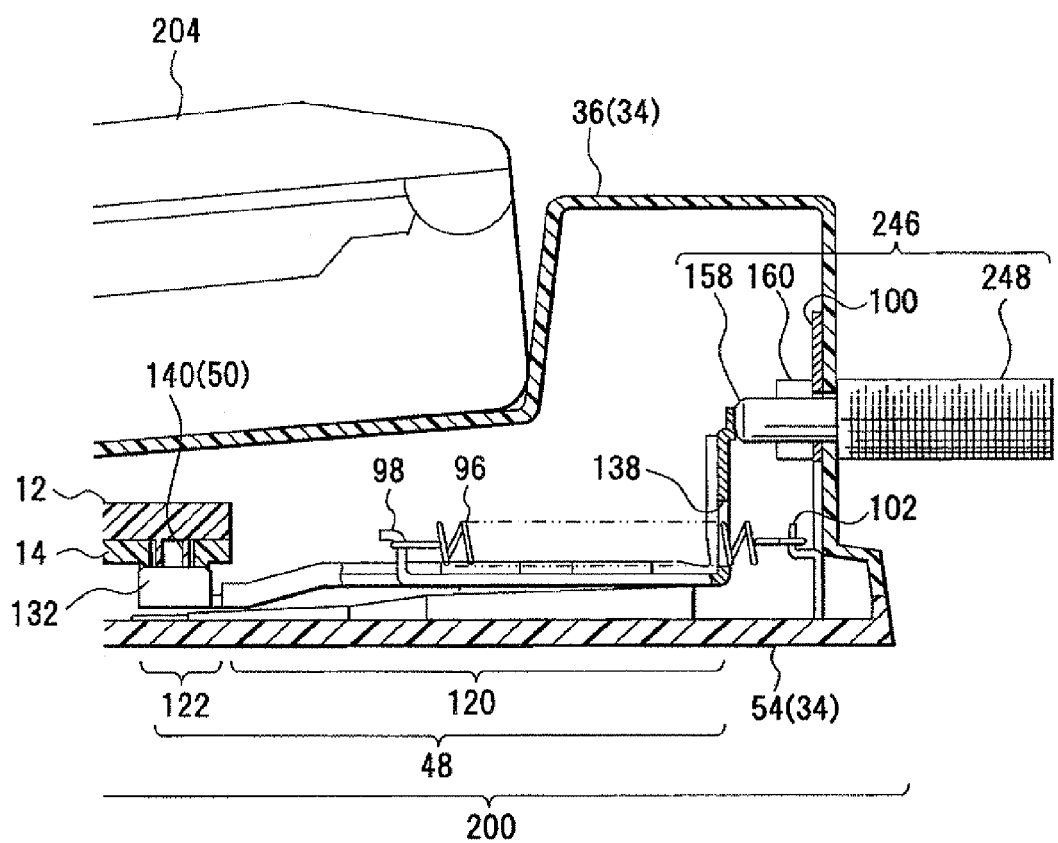
FIG. 46 is a view illustrating the port replicator locked by utilizing the locking fixture.

A third embodiment is described with reference to FIGS. 45 and 46. FIG. 45 is a view illustrating a locking fixture. FIG. 46 is a view illustrating the port replicator 200 locked by utilizing the locking fixture.

In the second embodiment, the locking device 240 is utilized as the locking member; however, the locking member may not be limited to the locking device 240. As illustrated in FIG. 45, a locking fixture 246 may include the aforementioned lock shaft 158 and a pair of lock flanges 160. The lock shaft 158 includes a knob 248. Each of the lock flanges 160 is formed on the lock shaft 158 in a diametrical direction of the lock shaft 158. A width between top portions of the lock flanges 160 is set larger than a short side of the rectangular lock window 136 of the rear panel part 100 such that the lock flanges 160 are inserted from the lock window 136. The interval Lx (see FIG. 38) is approximately set such that a thickness obtained by adding a thickness of the rear panel part 100 and a thickness of the upper case part 36 is sandwiched between the knob 248 and the lock flanges 160.

As illustrated in FIG. 46, the lock arm part 48 is moved to the locking position and maintained at the locking position by attaching the locking fixture 246 to the port replicator 200. The PC 204 attached to the port replicator 200 may thus be prevented from being detached from the port replicator 200 and the attaching state of the PC 204 may be stabilized.

The characteristics and advantageous effects obtained by the aforementioned first, second and third embodiments are recited below.

(1) The slide part 12 and the lock arm part 48 form a first locking mechanism and the slide part 14 and the lock arm part 48 form a second locking mechanism. Thus, a locking structure to lock the two slide parts 12 and 14 operated by the common lock arm part 48 may be formed.

(2) The lock part 50 is formed of the rib 140 and the lock part 52 is formed of the rib 142. The ribs 140 and 142 are restrained by the restraining part 122 when the ribs 140 and 142 are locked.

The lock part 50 of the slide part 12 is inserted into the recess 53 of the lock part 52 of the slide part 14. The recess 53 blocks a traveling direction of the slide part 14 and the lock part 50 of the slide part 12 comes in contact with a wall of the recess 53. The moving start positions of the lock parts 50 and 52 of the slide parts 12 and 14 are set to the locking position such that the lock parts 50 and 52 may be restrained at this position by the restraining part 122 of the lock arm part 48.

(4) The PC 204 docks with the locking unit 2 or the port replicator 200. If the security plug 156 is inserted in the locking unit 2, the PC 204 may be incapable of detaching from the locking unit 2 or the port replicator 200. Further, if the security plug 156 is removed, the fixed state of the locking unit 2 may be released by the operation of the lever part 16.

(5) The port replicator 200 serving as an extended I/O unit of the PC 204 includes the connector 210, and the connector 210 of the port replicator 200 may be coupled with the connector 224 of the PC 204. In this case, the coupling of the connectors 210 and 224 alone may be easily released. However, since the PC 204 is fixed by the hook parts 28 of the locking unit 2, the coupling of the connector parts 210 and 224 may be enhanced. The slide parts 12 and 14 may include a mechanism to slide by the restoring force of the springs 44 and 46. The slide parts 12 and 14 simultaneously slide by setting the angle of the lever part 16 at an angle range of $\theta=0$ to $\theta_1$, which is the range within which the hook parts 28 are engaged or disengaged. Further, the slide part 12 may be stopped by setting the angle of the lever 16 at an angle of $\theta=\theta_1$, and the slide part 14 may slide by setting the lever part 16 at an angle range of $\theta=\theta_1$ to $\theta_2$. This is the range within which the hook parts 28 are projected to the lifting mechanical part 10A and 10B.

(6) A sliding width $M_1$ of the slide part 12 is determined by a longitudinal diameter of the slide hole 76, and a moving start point and the locking position are determined by the contact position of the edge of the slide hole 72 and the slide support shaft 60. The sliding width $M_1$ is an angle range of $\theta=0$ to $\theta_1$ of the lever part 16. In this case, the sliding width $M_1$ is the range in which moving force is applied from the rod part 20 to the cam part 24 of the slide part 12. When the lever part 16 reaches the angle $\theta_1$, the slide support shaft 60 collides with an internal edge of the slide hole 72. Accordingly, the slide part 12 may be stopped from moving. Note that in the angle range of $\theta=0$ to $\theta_1$ of the lever part 16, force is applied from the rod part 22 to the cam part 26 of the slide part 14, which also moves the slide part 14. With this movement, the lifting parts of the lifting mechanical parts 10A and 10B include no projection. The angle range of $\theta=0$ to $\theta_1$ of the lever part 16 may be the range for preparing the lifting.

(7) A sliding width $M_2$ of the slide part 14 is determined by a longitudinal diameter of the slide hole 78, and a moving start point and the locking position are determined by the contact position of the edge of the slide hole 78 and the slide support shaft 60. The sliding width $M_2$ is an angle range of $\theta=0$ to $\theta_2$ of the lever part 16. In this case, the sliding width $M_2$ is the range in which moving force is applied from the rod part 22 to the cam part 26 of the slide part 14. In the angle range of $\theta=\theta_1$ to $\theta_2$ of the lever part 16, the lifting parts of the lifting mechanical parts 10A and 10B are raised and projected. Thus, the connector parts 210 and 224 may be detached.

(8) When the lever part 16 reaches the angle $\theta=\theta_2$, the projection 149 of the lifting part 32 moves beyond the stopper 151 and reaches the flat portion 153. If the lifting parts 32 of the lifting mechanical parts 10A and 10B receive loads from above due to the self-weight of the PC 204, the lifting mechanical parts 10A and 10B are maintained in the lifted state. If the loads applied to the lifting parts 32 overcome the restoring force of the springs 44 and 46, the projections 149 of the lifting parts 32 may be prevented from moving beyond the stopper 151. In this state, when the PC 204 is picked up to release the loads, the lifted state of the lifting mechanical parts 10A and 10B may be released to move the lifting mechanical parts 10A and 10B back to the original positions. That is, automatic restoration may be executed.

(9) Thus, in detaching the PC 204, the slide part 12 is moved by the operation of the lever part 16 to detach the hook parts 28 from the PC 204. Further, the operation of the lever part 16 may cause the lever part 16 to slide alone to lift up the PC 204, which may release the coupling of the connectors.

(10) The slide part 12 is disposed over the slide part 14. The slide part 14 slides on the rail part 56 and the slide part 12 slides on the slide part 14. The slide parts 12 and 14 may slide at different timing by the rotational angle of the lever part 16. Such a sliding operation may be achieved by the single operation of the lever part 16.

(11) The lock parts of the slide parts 14 and 12 locked by the locking mechanical part 6 are covered by the slide parts 12 and 14 to make it uneasy to unlock the lock parts of the slide parts 12 and 14.

(12) In the aforementioned embodiments, the ribs 140 and 142 are provided as the lock parts 50 and 52 of the slide mechanical part 6 of the slide parts 12 and 14, which serve as internal structural components of the port replicator 200, and the ribs 140 and 142 are locked by the lock arm part 48. Accordingly, the locking mechanical part 6 is small comparative to the port replicator 200, which may not degrade the appearance of the port replicator.

(13) The security plug 15 such as the Kensington lock6 may be utilized for locking, which may prevent the electronic devices from being stolen.

Comparative Example

The comparative example represents a structure in which one of the slide parts is locked.

Figure 47:
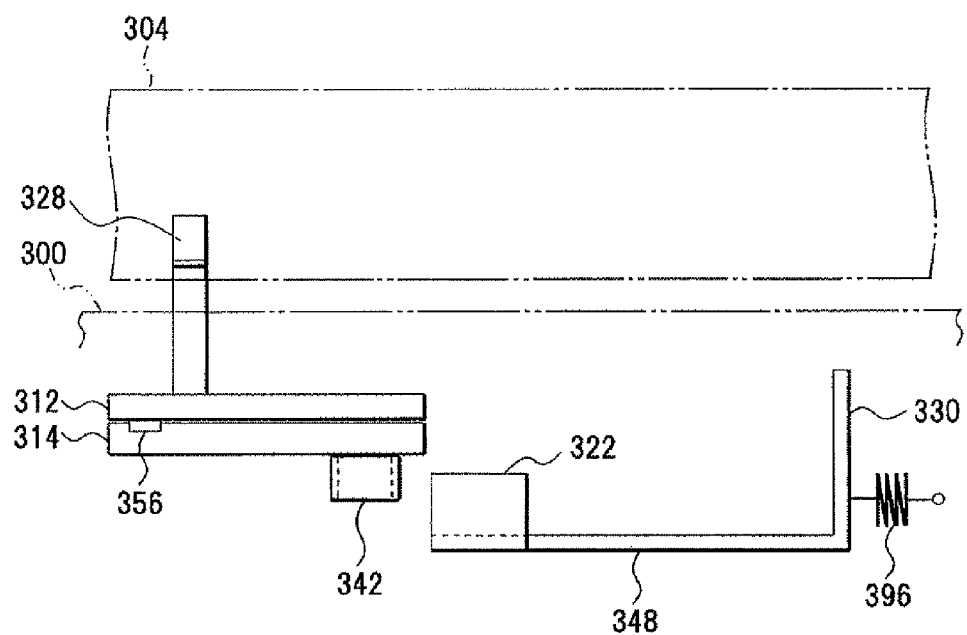
FIG. 47 is a comparative example of a locking device.
Figure 48:
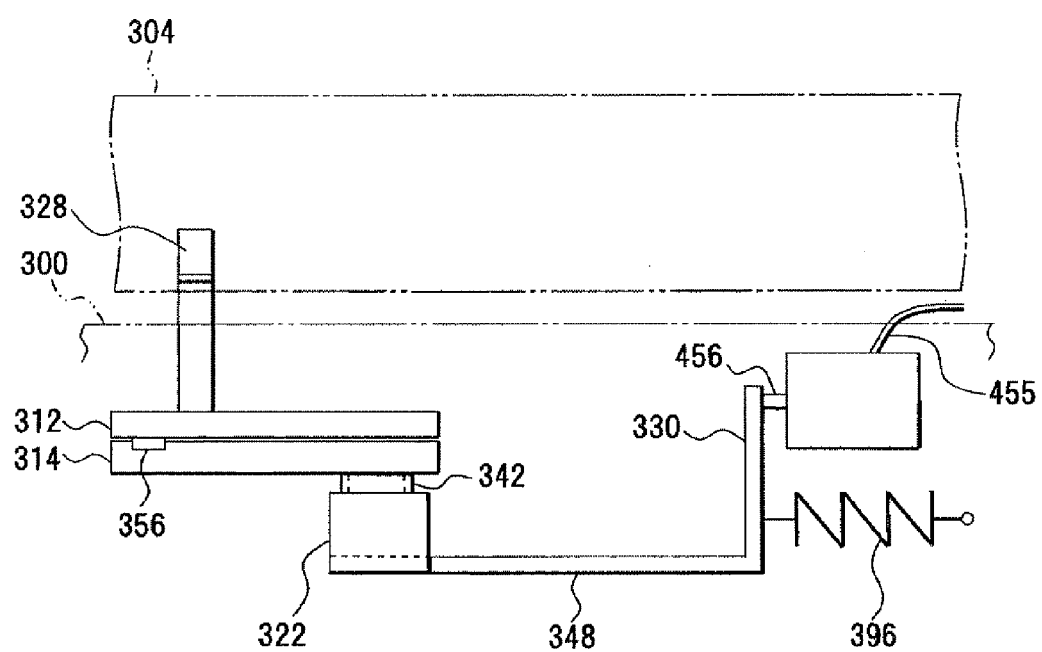
FIG. 48 is a comparative example locked by the locking device.
Figure 49:
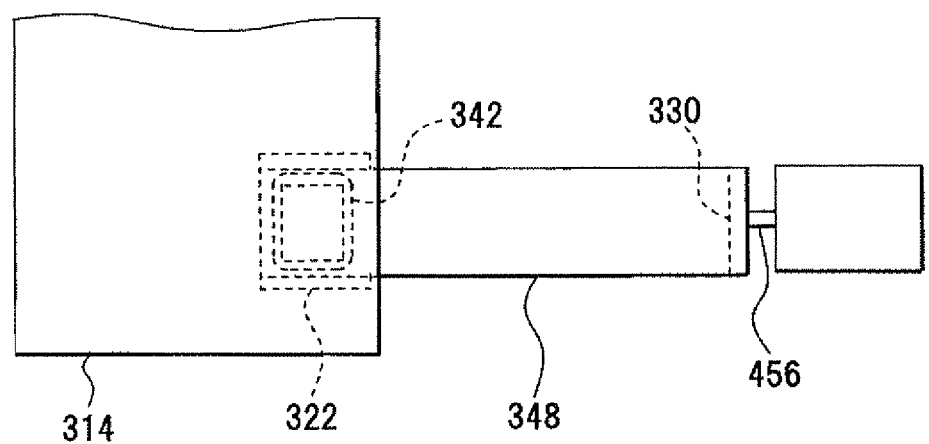
FIG. 49 is a view illustrating a locked state.

Next, an adjuster operation is described with reference to FIGS. 47 and 49. FIG. 47 is a view illustrating slide parts and a lock arm part. FIG. 48 is a view illustrating a locked state of the slide parts. FIG. 49 is a view illustrating the locked state viewing from the slide parts.

In the comparative example, a port replicator 300 includes a slide part 312 and a slide part 314, with the slide part 312 being disposed over the slide part 314, and a rail part 356 allowing the slide parts to slide. The slide part 312 includes claws 328 to latch a mobile computer 304. The claws 328 correspond to the aforementioned hook parts 28. The slide part 314 includes a rib 342. That is, the claws 328 are disposed at an upper part and the rib 342 is disposed at a lower part.

A lock arm part 348 is disposed as an actuator. A restraining part 322 is disposed at a front end of the lock arm part 348 and a operation part 330 is disposed at a rear end of the lock arm part 348. The restraining part 322 may engaged with the rib 342 of the slide part 314. The operation part includes a spring 396. That is, tension is applied by the spring 396 to the lock arm part 348 in a direction in which the lock arm part 348 moves away from the rib 342.

With this configuration, a security plug 456 such as the Kensington lock that is connected to a security wire 455 may be utilized for prevent the mobile computer from being stolen as illustrated in FIG. 48. When the security plug 456 is attached, the spring 396 is extended to move the lock arm part 348 toward the rib 342 side, and the restraining part 322 holds the rib 342 as illustrated in FIG. 49. Accordingly, the operation of the slide part 314 may be prevented. That is, the slide part 314 is in a locked state.

In this case, restoring force of the spring 396 is applied to the lock arm part 348. Accordingly, when the security plug 456 is removed, the spring 396 may contract to move the lock arm part 348 back to the original position. That is, the slide part 314 is unlocked. Accordingly, the slide part 314 may become operable.

If such a locking structure is defined as an anti-theft structure, the slide part 314 that is in the locked state may be prevented from being operated. However, the slide part 312 having the claws 328 may not be locked. The mobile computer 304 may be attached to or detached from the claws 328 of the slide part 312 with the security plug 456 being attached to the slide part 314.

With such a structure, since the slide part 312 is unlocked, the claws 328 may be moved by inserting a thin member into a gap between the port replicator 300 and the mobile computer 304. The mobile computer 304 may be detached form the port replicator 300 by moving the claws 328. In the embodiments described above, such a disadvantageous effect may be eliminated.

Figure 50:
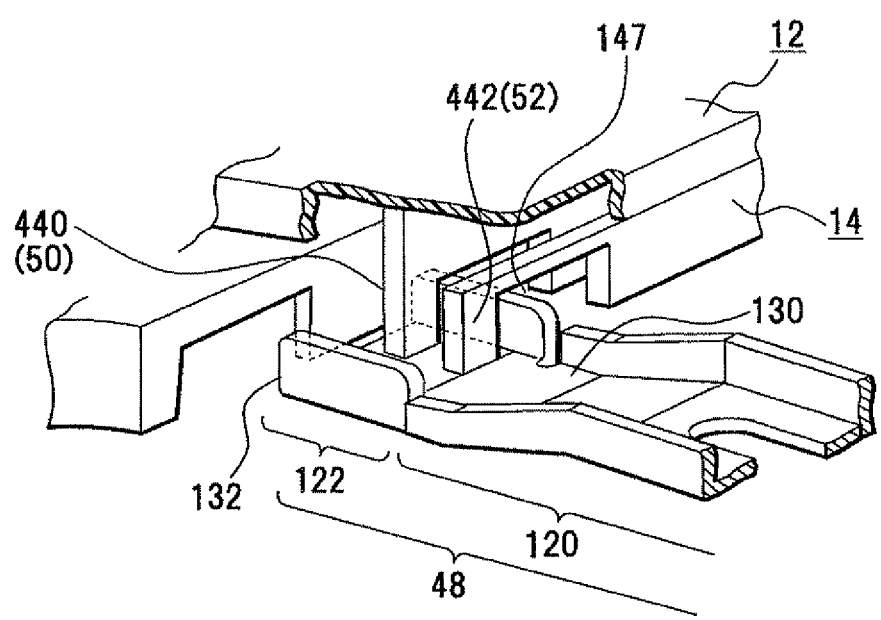
FIG. 50 is a view illustrating a locking structure according to another embodiment.

Other Embodiment (1) In the aforementioned embodiments, the rib 140 having a C-shaped cross-section is utilized for the lock part 50 and the tubular (e.g., a block shape) rib 142 having a C-shaped cross-section is utilized for the lock part 52. However, the lock parts 50 and 52 may not be limited to the ribs 140 and 142. As illustrated in FIG. 50, a plate-like rib 440 may be projected from the slide part 12, a plate-like rib 442 may be projected from the slide part 14 in a manner similar to the plate-like rib 440, and a window 147 may be formed in the slide part 12. With such a configuration, the ribs 440 and 442 may be adjacently disposed at the locking position, and the ribs 440 and 442 may be restrained by the stand wall 132 of the restraining part 122 of the lock arm part 48. With this configuration, the slide parts 12 and 14 may be locked at the locking position by restraining the lock arm part 48.

Figure 51:
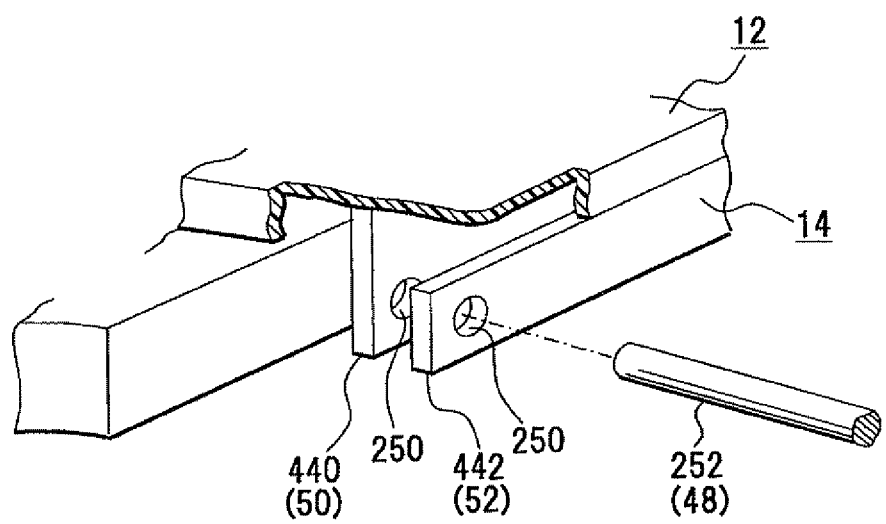
FIG. 51 is a view illustrating a locking structure according to another embodiment.

(2) As illustrated in FIG. 51, the locking mechanical part 6 may include the ribs 440 and 442 serving as the lock parts 50 and 52, and through-holes 250 may be formed in the ribs 440 and 442. In this configuration, the slide parts 12 and 14 may be restrained by inserting the lock arm part 48 into the through-holes 250. In this case, the lock arm part 48 may be formed of a shaft 252 capable of being inserted into the through-holes 250.

(3) In the aforementioned embodiments, $\theta_1$ and $\theta_2$ are set as the rotational angle $\theta$ of the lever part 16. The position at which the hook parts 28 may be disengaged is set as $\theta_1$ and the position at which the lifting mechanical parts 10A and 10B are lifted is set as $\theta_2$. However, the rotational angle $\theta$ of the lever part 16 may not limited as described above. For example, the lifting mechanical parts 10A and 10B may be lifted by an angle corresponding to the position at which the hook parts 28 are disengaged, and hence the angle of the lever part 16 may be optionally set.

(4) In the aforementioned embodiments, the port replicator 200 is illustrated as an example of the electronic device; however, the electronic device may not be limited to the port replicator 200. The electronic device may be a main phone and a cordless handset of a telephone, or may be a telephone and a cradle insofar as they include a configuration having the locking unit 2 to couple the devices.

The preferred embodiments of the disclosed locking device, the electronic device and the locking method are described above. The present invention is not limited to those described above, and various modifications and alterations may be made by those skilled in the art based on the scope of the claims and the gist of the invention disclosed in the description and included within the scope of the invention.

The disclosed locking device, electronic device and locking method may provide the following advantageous effects.

(1) Unlocking may be made difficult without making a complicated structure.

(2) Connector coupling is protected from external force, and the connector coupling may be stabilized.

(3) Enhancing prevention of electronic devices such as portable computers from being stolen by making unlocking difficult.

The disclosed locking device, electronic device or locking method may be utilized for attaching or detaching two devices, such as the port replicator and the mobile computer, and may provide a stable connector coupling of the devices and effective anti-theft function by locking the coupling.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. A locking device comprising:
   a first slide part having a first lock part and configured to be movable;
   a second slide part having a second lock part and configured to support the first slide part and be movable independently from the first slide part; and
   a lock arm part configured to be movable in a direction intersecting with the first slide part and the second slide part and including a pair of stand walls between which the first lock part and the second lock part are inserted, when the first and second lock parts are in a locking position, to prevent the first slide part and the second slide part from moving.

2. The locking device as claimed in claim 1, further comprising:
   a lever part configured to rotate by an operation thereof; and
   a sliding mechanism configured to cause, upon receiving the operation of rotating the lever part, one of the first slide part and the second slide part to move in an identical direction.

3. The locking device as claimed in claim 1, further comprising:
   a holding unit configured to separate the lock arm part from an engaged position of the first lock part and the second lock part and hold the lock arm part, wherein
   the lock arm part is movable by a locking member to the engaged position against the holding unit.

4. The locking device as claimed in claim 1, wherein
   the first lock part is a first rib projected from the first slide part, and
   the second lock part is a second rib projected from the second slide part, the second rib being disposed adjacent to the first rib or the second rib having an insertion part to which the first rib is inserted.

5. The locking device as claimed in claim 1, wherein
   the first slide part includes a hook part and the second slide part includes a lift-up part.

6. An electronic device coupled with a mobile computer, the electronic device comprising the locking device as claimed in claim 1.

7. An electronic device coupled with a mobile computer, the electronic device comprising the locking device as claimed in claim 2.

8. An electronic device coupled with a mobile computer, the electronic device comprising the locking device as claimed in claim 3.

9. An electronic device coupled with a mobile computer, the electronic device comprising the locking device as claimed in claim 4.

10. An electronic device coupled with a mobile computer, the electronic device comprising the locking device as claimed in claim 5.

11. A locking method comprising:
    moving a first lock part of a first slide part and a second lock part of a second slide part to a locked position;
    moving a lock arm part including a pair of stand walls in a direction intersecting with the first slide part and the second slide part; and
    inserting the first lock part and the second lock part, when the first and second lock parts are in the locking position, such that the lock arm part between the stand walls of the lock arm part to prevent the first slide part and the second slide part from moving.

12. The locking method as claimed in claim 11, further comprising:
    rotating a lever part by an operation thereof; and
    allowing, upon reception of the operation of rotating the lever part, one of the first slide part and the second slide part to move in an identical direction.

13. The locking method as claimed in claim 11, further comprising:
    separating the lock arm part from an engaged position of the first lock part and the second lock part and holding the lock arm part by a holding unit; and
    moving the lock arm part to the engaged position against the holding unit.

14. The locking method as claimed in claim 11, wherein
    the first lock part is a first rib projected from the first slide part, and
    the second lock part is a second rib projected from the second slide part, the second rib being disposed adjacent to the first rib or the second rib having an insertion part to which the first rib is inserted.

15. The locking method as claimed in claim 11, wherein
    the first slide part includes a hook part and the second slide part includes a lift-up part.

* * * * *

UNITED STATES PATENT AND TRADEMARK OFFICE
CERTIFICATE OF CORRECTION

PATENT NO.        : 8,867,203 B2
APPLICATION NO.   : 13/459758
DATED             : October 21, 2014
INVENTOR(S)       : Masao Katsuta et al.

Page 1 of 1

It is certified that error appears in the above-identified patent and that said Letters Patent is hereby corrected as shown below:

In the Claims

Column 20, Lines 11-12, in Claim 11, delete "position, such that the lock arm part" and insert -- position, --, therefor.

Signed and Sealed this
Twenty-fourth Day of February, 2015

Michelle K. Lee
*Deputy Director of the United States Patent and Trademark Office*